(12) United States Patent
Liu

(10) Patent No.: US 12,452,983 B1
(45) Date of Patent: Oct. 21, 2025

(54) ADAPTIVE INTELLIGENT DRIVING CIRCUIT AND METHOD FOR LED LAMPS

(71) Applicant: Guangdong Jindian Smart Technology Co., Ltd., Guangdong (CN)

(72) Inventor: Hongbo Liu, Guangdong (CN)

(73) Assignee: Guangdong Jindian Smart Technology Co., Ltd., Guangdong (CN)

( * ) Notice: Subject to any disclaimer, the term of this patent is extended or adjusted under 35 U.S.C. 154(b) by 0 days.

(21) Appl. No.: 19/208,847

(22) Filed: May 15, 2025

(51) Int. Cl.
*H05B 47/195* (2020.01)
*H05B 45/10* (2020.01)
*H05B 45/20* (2020.01)

(52) U.S. Cl.
CPC ........... *H05B 47/195* (2020.01); *H05B 45/10* (2020.01); *H05B 45/20* (2020.01)

(58) Field of Classification Search
CPC ........ H05B 45/20; H05B 45/10; H05B 47/19; H04B 2203/5412
See application file for complete search history.

(56) References Cited

U.S. PATENT DOCUMENTS

| | | | |
|---|---|---|---|
| 11,109,471 B1* | 8/2021 | Recker | H02J 9/02 |
| 2017/0223807 A1* | 8/2017 | Recker | H02J 13/00006 |
| 2017/0231058 A1* | 8/2017 | Sadwick | H05B 47/19 |
| 2018/0279429 A1* | 9/2018 | Sadwick | H05B 45/3578 |
| 2019/0098723 A1* | 3/2019 | Sadwick | H05B 45/3578 |
| 2019/0098725 A1* | 3/2019 | Sadwick | H05B 45/20 |
| 2023/0189409 A1* | 6/2023 | Xiong | H05B 45/31 315/294 |

* cited by examiner

*Primary Examiner* — Monica C King
(74) *Attorney, Agent, or Firm* — Cooper Legal Group, LLC

(57) ABSTRACT

The present application relates to an adaptive intelligent driving circuit and method for an LED lamp. The adaptive intelligent driving circuit for the LED lamp includes an LED lamp module, a control system and an AC-DC adapter module, wherein a power output terminal of the control system is connected to a power input terminal of the LED lamp module, and a remote signal receiving terminal of the control system is configured for receiving remote control signals including an APP-side control signal and a remote controller control signal, and the control system is configured for generating driving signals having interleaved phases and transmitted through corresponding driving paths according to the remote control signals, and wherein the driving signals correspond to different channels of the LED lamp module, so that various lamp beads in different channels of the LED lamp module switch to operate at different time points.

11 Claims, 14 Drawing Sheets

ADAPTIVE INTELLIGENT DRIVING CIRCUIT AND METHOD FOR LED LAMPS

TECHNICAL FIELD

The present application relates to a technical field of intelligent driving of LED lamps, and more particularly to an adaptive intelligent driving circuit and method for LED lamps.

BACKGROUND ART

At present, with the wide application of LED technology in a field of illuminating, the demand for intelligent control of brightness, color temperature and color adjustment is increasing. The traditional LED drive control methods typically employ drive signals such as Pulse Width Modulation signals to adjust brightness and color, and in-phase drive control has been widely used because of its simple implementation and intuitive control logic. However, in practical application, in-phase driving signals may cause multiple LED channels to switch at the same time, resulting in severe fluctuations in instantaneous current and large voltage drop at the input terminal, triggering excessive ripple currents and stroboscopic phenomena. Furthermore, high load currents may activate an overload protection mechanism in power supply, affecting a normal operation of the LED lamp, and even causing instability of the illuminating system.

SUMMARY

In order to solve the problem of illuminating system instability caused by conventional LED driving control methods employing in-phase driving signals, the present application provides an adaptive intelligent driving circuit and method for LED lamps.

An adaptive intelligent driving circuit for LED lamps includes an LED lamp module, a control system and an AC-DC adapter module, where a power input terminal of the AC-DC adapter module is connected to a power grid, a power output terminal of the AC-DC adapter module is connected to a power input module of the control system, a power output terminal of the control system is connected to a power input terminal of the LED lamp module, and a remote signal receiving terminal of the control system is configured for receiving remote control signals including an APP-side control signal and a remote controller control signal, and the control system is configured for generating driving signals having interleaved phases and transmitted through corresponding driving paths according to the remote control signals, and wherein the driving signals correspond to different channels of the LED lamp module, so that various lamp beads in different channels of the LED lamp module switch to operate at different time points.

Preferably, the LED lamp module includes a lamp bead LED1, a diode D1 and a resistor R1, where an anode of the diode D1 is connected to a power supply, a cathode of the diode D1 is connected to a power input terminal of the LED1 lamp bead, the resistor R1 is connected between the power input terminal of the lamp bead LED1 and the power supply, and a capacitor C1 and a capacitor CA1 are connected between the cathode of the diode D1 and ground.

Preferably, the control system includes a path selection module and a driving module, where the driving module is a multi-channel driving module, the driving module includes a plurality of driving units each including a driving chip and a power input subunit, a first power input terminal of the driving chip is connected to a power output terminal of the LED lamp module via one or more first unit resistors, where an end portion of each of the one or more first unit resistors close to the power output terminal of the LED lamp module is provided with an acquisition node; and the acquisition node is connected to an acquired signal input terminal of the path selection module, a grounding terminal of the driving chip is grounded, a power input terminal of the power input subunit is connected to a cathode of the diode D1, and a power output terminal of the power input subunit is connected to a second power input terminal of the driving chip.

Preferably, the power input subunit includes a second unit resistor, a third unit resistor and a unit capacitor, wherein a first end of the second unit resistor is connected to the cathode of the diode D1, a second end of the second unit resistor is connected to a first end of the third unit resistor, a second end of the third unit resistor is grounded, and the unit capacitor is connected between the second end of the second unit resistor and the ground.

Preferably, the control system includes a path selection module and a driving module, where the driving module is a multi-channel driving module, and the LED lamp module includes one or more lamp display units; the multi-channel driving module and each of the lamp display units constitute a power supply loop; the acquired signal input terminal of the path selection module is connected to a signal output terminal of the LED lamp module to acquire lamp bead type data of the LED lamp module, a data communication terminal of the path selection module communicates with a cloud platform to acquire adaptive voltage data of the LED lamp module, and the path selection module is configured to generate corresponding driving signals according to the adaptive voltage data, the lamp bead type data and the remote control signals; and a driving signal input terminal of the driving module is connected to a driving signal output terminal of the path selection module, so that the driving module receives the corresponding driving signals to control lamp display units located in a same power supply loop as the driving module to perform corresponding lamp display operations.

An adaptive intelligent driving method for LED lamps is applied to the adaptive intelligent driving circuit for the LED lamps, the control system includes a path selection module and a driving module, the driving module is a multi-channel driving module, and the adaptive intelligent driving method for the LED lamps includes:
  controlling the path selection module to detect in real time whether an infrared coverage signal appears at an acquisition node between an LED lamp module template and the driving module;
  determining that the LED lamp module exists in the LED lamp module template if the infrared coverage signal is detected, parsing the infrared coverage signal to generate corresponding lamp bead type data;
  controlling the path selection module to acquire adaptive voltage data of the LED lamp module based on data communication with a cloud platform;
  inputting the lamp bead type data and the adaptive voltage data into an established driving path selection algorithm model to generate corresponding driving path selection signals; and
  if a remote control signal is received, generating a corresponding driving signal based on the remote control signal and the driving path selection signal, and controlling the path selection module to transmit the driving signal to the driving module so that the LED lamp module performs corresponding lamp display operations.

Preferably, upper and lower sides of the acquisition node are respectively provided with a transmitter component and a receiver component of an infrared sensing element, and the infrared coverage signal is a signal generated when a channel port of the LED lamp module connected to the driving module is irradiated by infrared rays from the transmitter component and the receiver component, and the method further includes:

if the receiver component fails to receive the infrared rays, starting timing to generate corresponding timing data, and comparing the timing data with a preset coverage threshold in real time;

if the timing data exceeds the preset coverage threshold, reading a matching code of the receiver component, and matching corresponding channel type data according to the matching code; and integrating the matching code and one or more piece of the channel type data to generate a corresponding infrared coverage signal.

Preferably, the step of parsing the infrared coverage signal to generate the corresponding lamp bead type data includes:

standardizing the infrared coverage signal to generate corresponding standardized data, wherein the standardized data at least includes code data corresponding to the matching code and first type data corresponding to each piece of the channel type data;

determining whether a corresponding type template is matched in an established type database based on the code data;

if the corresponding type template is matched, verifying whether second type data in the type template is consistent with the first type data, if inconsistent, transmitting a signal acquisition request to acquire a new infrared coverage signal for parsing, and if consistent, determining the first type data as the lamp bead type data; and if no corresponding type template is matched, establishing a new type template, and assigning the first type data as second type data to the new type template, and after the new type template is stored in the type database, determining the second type data in the new type template as the lamp bead type data.

Preferably, the step of inputting the lamp bead type data and the adaptive voltage data into an established driving path selection algorithm model to generating the corresponding driving path selection signal includes:

determining a minimum driving demand according to the lamp bead type data, and generating a corresponding base weight based on the minimum driving demand;

determining a cost-control driving demand according to the adaptive voltage data, and generating a corresponding balance weight based on the cost-control driving demand;

determining a corresponding type coefficient and a voltage adaptation coefficient based on the established driving path selection algorithm model, and adding a product of the type coefficient and the base weight and a product of the voltage adaptation coefficient and the balance weight to generate corresponding path selection parameters; and generating the corresponding driving path selection signal based on a predetermined mapping relationship of the path selection parameters.

Preferably, the step of generating the corresponding driving signal based on the remote control signal and the driving path selection signal includes:

decoding the remote control signal to generate a corresponding channel control demand;

determining one or more driving paths according to the path selection signal;

determining a current demand of each of the one or more driving paths according to the channel control demand, and further determining a signal duty cycle to be transmitted to each of the one or more driving paths based on the current demand; and integrating the signal duty cycle of each of the one or more driving paths to generate the corresponding driving signal.

In summary, the present application includes at least one of the following beneficial technical effects:

The present application enables sequential activation/deactivation of different channels in a predetermined timing sequence in the LED lamp module based on an interleaved phase driving control method, thereby preventing the problem of instantaneous current impact caused by simultaneous multi-channel activation. As the LED lamp beads in different channels switch to operate at different time points, the power supply exhibits balanced current demand, which can effectively reduce voltage drop at the input terminal and generation of ripple current, thereby improving stability of the LED lamp module, reducing flicker problems, making the light output more uniform and stable, and improving visual comfort for users. The adaptive intelligent driving circuit for the LED lamps can accurately drive each channel of the LED lamp module in combination with a corresponding driving path, and ensure that each lamp bead obtains an adaptive driving signal according to characteristics and operational requirements thereof. This driving method can effectively accommodates voltage and current demands of LED lamp beads of different types, eliminating luminance inconsistency and power dissipation from electrical mismatch. Thus, energy efficiency ratio of LED can be improved, service life of lamp beads can be extended. In this way, it is ensured that the illuminating system can maintain optimal brightness and chromaticity control effect in various operating conditions.

DETAILED DESCRIPTION

Figure 1:
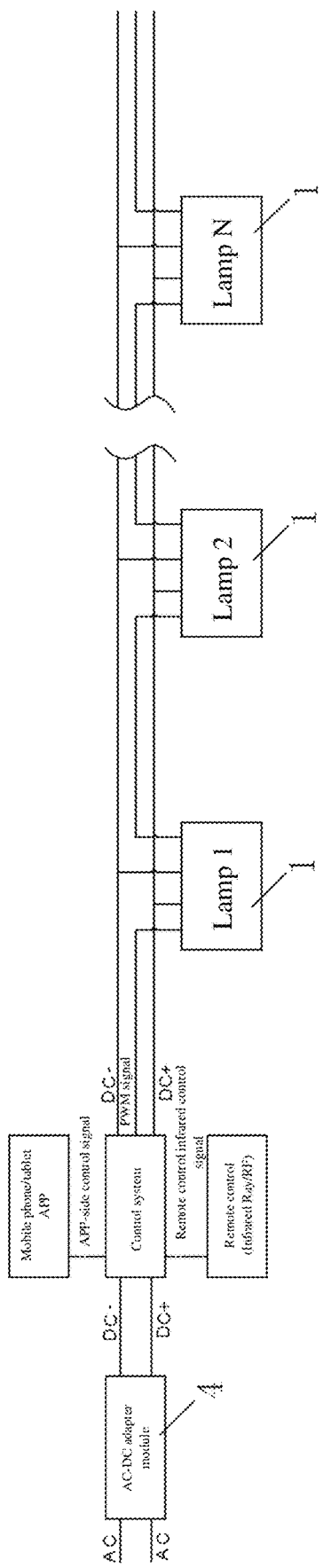
FIG. 1 is a schematic structural diagram showing an adaptive intelligent driving circuit for LED lamps according to an embodiment of the present application.
Figure 2:
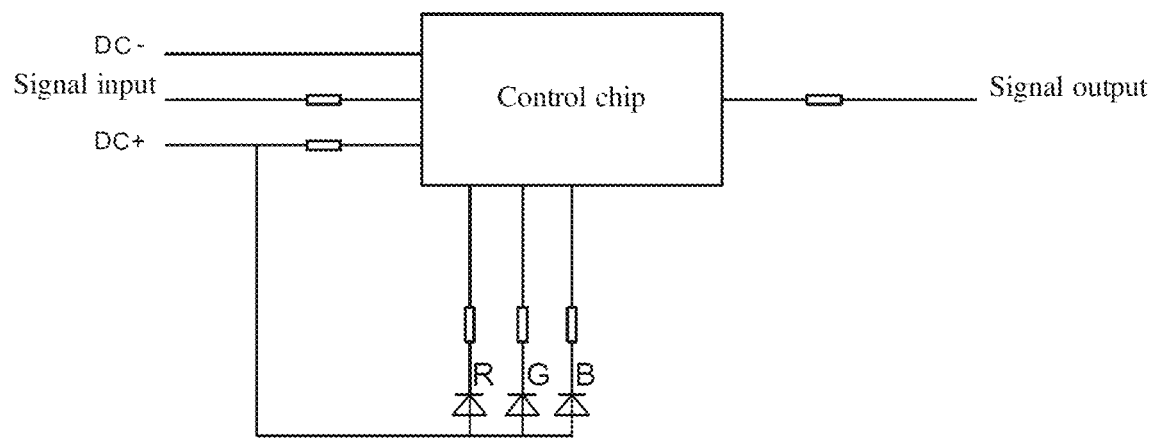
FIG. 2 is a schematic structural diagram showing a circuit of a lamp display unit with a 3-channel configuration in the adaptive intelligent driving circuit for the LED lamps according to an embodiment of the present application.
Figure 3:
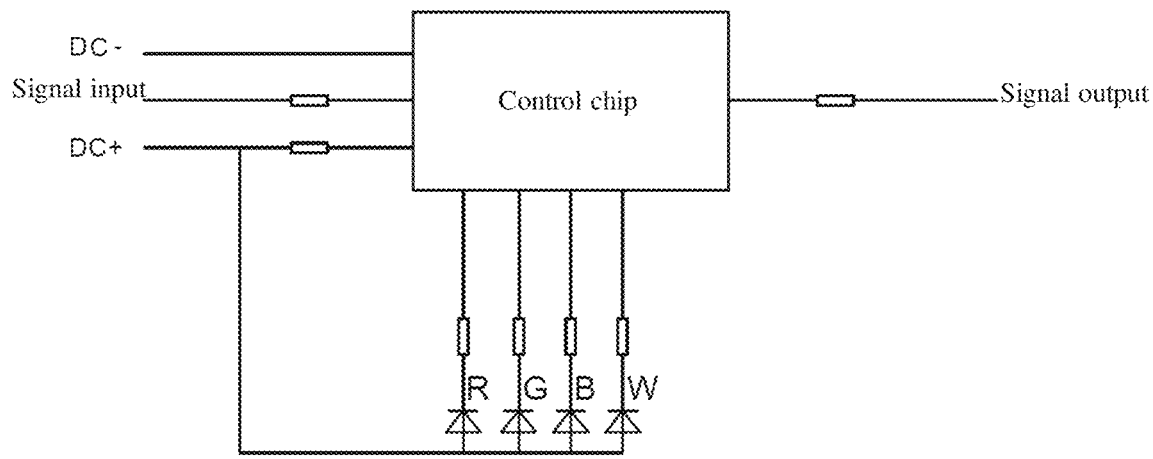
FIG. 3 is a schematic structural diagram showing a circuit of a lamp display unit with a 4-channel configuration in the adaptive intelligent driving circuit for the LED lamps according to an embodiment of the present application.
Figure 4:
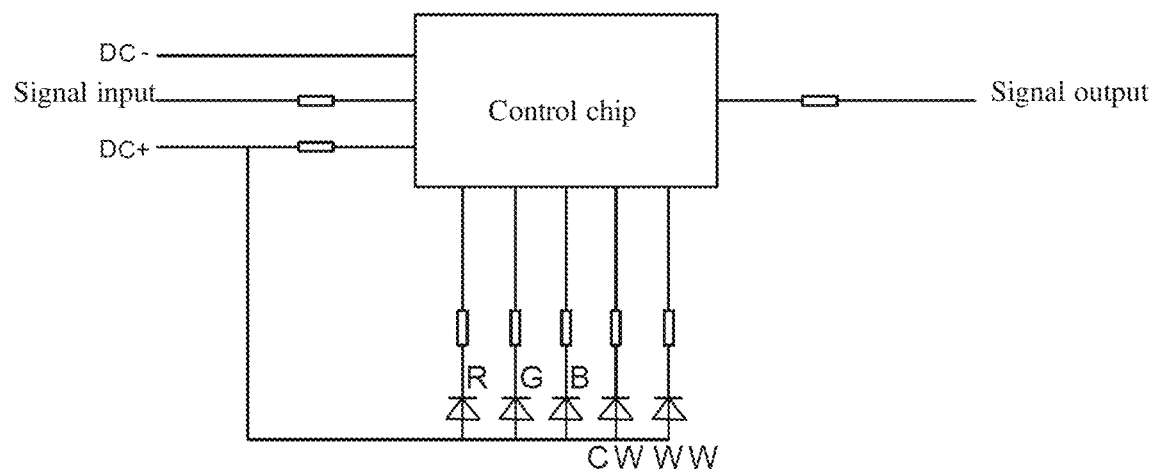
FIG. 4 is a schematic structural diagram showing a circuit of a lamp display unit with a 5-channel configuration in the adaptive intelligent driving circuit for the LED lamps according to an embodiment of the present application.
Figure 5:
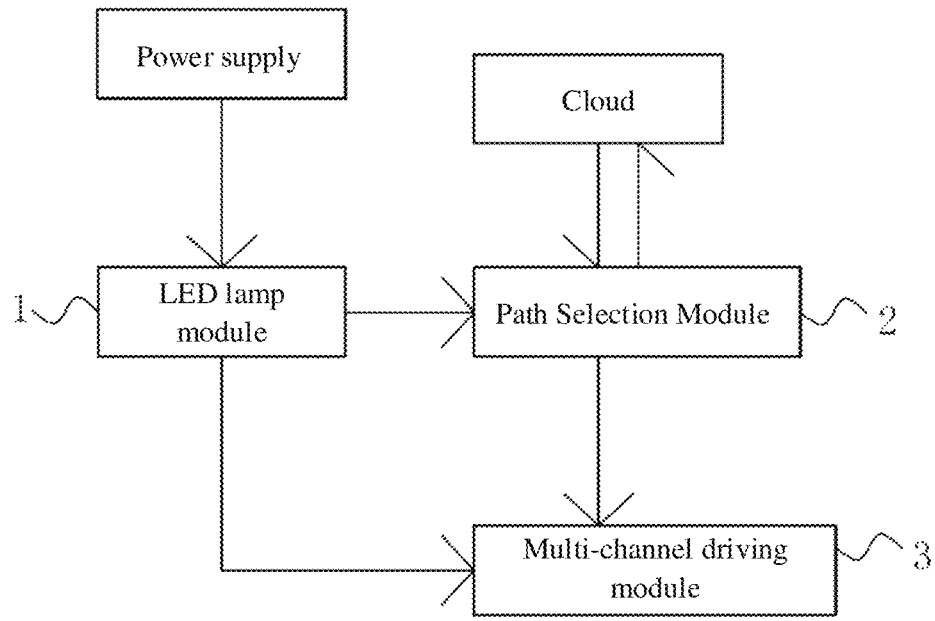
FIG. 5 is a partial flow block diagram showing the adaptive intelligent driving circuit for the LED lamps according to an embodiment of the present application.

The present application will be described in further detail below referring to the figures.

In an embodiment, as shown in FIGS. 1-4, the present application provides an adaptive intelligent driving circuit for LED lamps including an LED lamp module 1, a control system and an AC-DC adapter module 4, wherein a power input terminal of the AC-DC adapter module 4 is connected to a power grid, a power output terminal of the AC-DC adapter module 4 is connected to a power input module of the control system, a power output terminal of the control system is connected to a power input terminal of the LED lamp module 1, and a remote signal receiving terminal of the control system is configured for receiving remote control signals including an APP-side control signal and a remote controller control signal, and the control system is configured for generating, according to the remote control signal, driving signals having interleaved phases and transmitted through corresponding driving paths. The driving signals correspond to different channels of the LED lamp module 1, so that various lamp beads in different channels of the LED lamp module 1 switch to operate at different time points.

In the present embodiment, the adaptive intelligent driving circuit for the LED lamps includes the LED lamp module 1, the control system and the AC-DC adapter module 4, and these modules cooperate with each other to constitute a complete LED intelligent driving system, so as to realize intelligent control of the LED lamps.

The AC-DC adapter module 4 mainly functions to convert alternating current (AC) supplied by the power grid into stable direct current (DC), thereby providing adaptive operational voltage for the entire system. As the LED lamps and the control system typically utilize low-voltage DC while grid electricity is generally supplied as 220 V or 110 V AC, therefore, this module constitutes a fundamental component for the system operation. The power input terminal of the AC-DC adapter module 4 is directly connected to the power grid, and through internal circuitry processes including rectification and voltage stabilization, direct current suitable for the control system and the LED lamp module 1 can be supplied at the power output terminal of the AC-DC adapter module 4.

The control system plays a central role in the present embodiment, and has the power input module connected to the power output terminal of the AC-DC adapter module 4, receiving stable DC power, and configured for subsequent signal processing and generation of driving signals. The remote signal receiving terminal of the control system is configured for receiving the remote control signals including control signals from APP interfaces and control signals sent by the remote controller. The control signal from the APP interfaces can be transmitted remotely through wireless communication (such as Wi-Fi, Bluetooth), and the infrared remote control signals are received and then transmitted to the control system through an infrared receiving module. The control system generates the driving signal with interleaved phases according to the received remote control signals and combined with predefined driving strategies, and transmits the signals to the corresponding LED lamp channel through selected driving paths.

The method for generating the driving signals is one of important features of the present embodiment. The control system enables the different channels of the LED lamp module 1 to be switched in operation at different time point by using interleaved-phase driving control method. In this way, simultaneous activation/deactivation of all LED channels can be prevented, and thus input voltage drops, excessive ripple current and flicker problems caused by instantaneous high-current surges can be avoided. Furthermore, the control system can also select an appropriate driving path according to characteristics of different channel of the LED lamp module 1, so as to ensure that LED lamp beads of different colors or different color temperatures can be driven in an optimized manner, thereby further improving the stability of the system and the quality of the light output.

The LED lamp module 1 includes a plurality of lamp beads respectively assigned to different channels, and the activation/deactivation and brightness adjustment of corresponding lamps can be controlled by the driving signals of the control system through different channels. Since the control system adopts the interleaved-phase driving method, the lamp beads of each channel may be activated or deactivated according to predetermined timing patterns instead at the same time point. In this way, current demand can be balanced effectively, and the triggering of power overload protection at the input terminal can be avoided. Meanwhile, power fluctuation can be reduced, and energy efficiency and reliability of the whole system can be improved. Furthermore, individual channels allow independent adjustment of the lamp beads based on configured color temperature and brightness parameters, enabling the LED lamp module 1 to achieve precise color reproduction and illuminating effects tailored to illuminating demands in different scenes.

Figure 7:
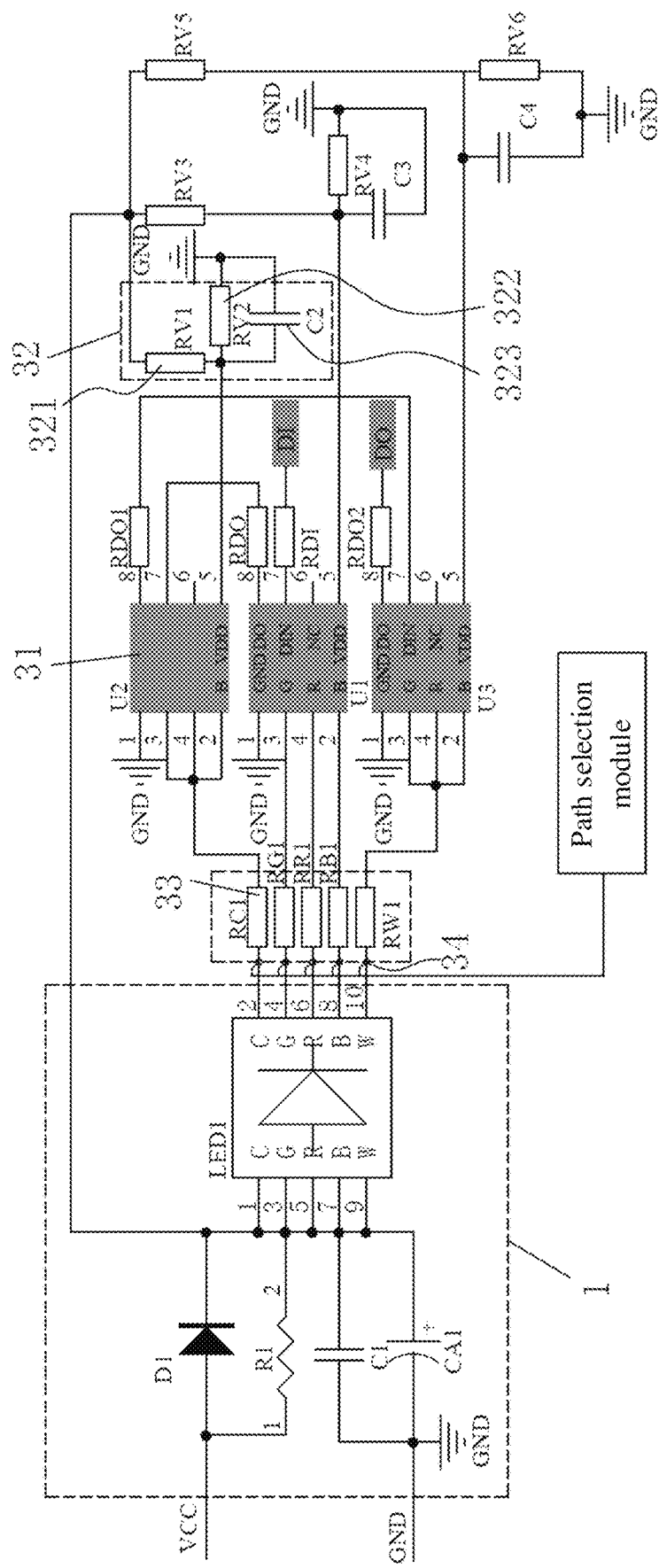
FIG. 7 is a partial schematic structural diagram showing a circuit of a 5-channel 3IC driving configuration in the adaptive intelligent driving circuit for the LED lamps according to an embodiment of the present application.

As shown in FIGS. 7 and 13-22, the following are all exemplified by the 5-channel lamp 3IC of FIG. 7, and the control system includes a path selection module 2 and a driving module 3 configured as a multi-channel driving module, and the LED lamp module 1 includes one or more lamp display units;

the driving module 3 and each of the lamp display units constitute a power supply loop;

the acquired signal input terminal of the path selection module 2 is connected to a signal output terminal of the LED lamp module 1 so as to acquire lamp bead type data of the LED lamp module 1, a data communication terminal of the path selection module 2 communicates with a cloud platform so as to acquire adaptive voltage data of the LED lamp module 1, and the path selection module 2 is configured to generate, according to the adaptive voltage data, the lamp bead type data and the remote control signals, corresponding driving signals; and a driving signal input terminal of the driving module 3 is connected to a driving signal output terminal of the path selection module 2, so that the driving module 3 receives a corresponding driving signal, and then controls a lamp display unit located in a same power supply loop as the driving module 3 to perform corresponding lamp display operations.

In the present embodiment, the adaptive intelligent driving circuit for the LED lamps, establishes logically structured interconnection between structural members and corresponding ports, thereby ensuring that the system can adaptively adjust the driving voltage and generate accurate driving signals to control the display operation of the LED lamp module 1.

First, the power input terminal of the LED lamp module 1 is connected to a power supply to be provides with power input, so that the operation of the LED lamp module 1 can be supported. The LED lamp module 1 is used as a load part of the whole circuit, receives an input power, and transmits the power to the lamp beads LED inside the LED lamp module. The power output terminal of the LED lamp module 1 is connected to the power input terminal of the driving module 3, which means that the LED lamp module 1 not only provides power to the lamp beads inside the LED lamp module during operation, but also outputs a power supply signal to the driving module 3, and this signal serves as an input of the driving module 3 to ensure that the driving module 3 has sufficient power to drive various LED channels. The power output terminal of the driving module 3 is grounded, indicating that the current in the power management circuit thereof flows back through the grounding terminal, completing circulation of the power. This power management structure ensures proper circuit functionality while providing stable voltage and current support.

Next, the acquired signal input terminal of the path selection module 2 is connected to the signal output terminal of the LED lamp module 1, with the purpose of enabling the path selection module 2 to monitor the operation state of the LED lamp module 1 in real time and acquire lamp bead type data. These data include attributes of the lamp beads such as color, brightness and power requirements. Through this connection, the path selection module 2 can identify basic characteristics of the connected LED lamp module 1. At the same time, the data communication terminal of the path selection module 2 communicates with the cloud platform, which means that the path selection module 2 cannot only rely on local data acquisition, but also can acquire the adaptive voltage data of the LED lamp module 1 through real-time data communication with the cloud platform. The data from the cloud platform provides detailed voltage demands for the LED lamp module 1, and the path selection module 2 generates corresponding driving signals based on these adaptive voltage data in combination with the lamp bead type data acquired from the LED lamp module 1.

The driving signal is generated by the path selection module 2 and transmitted via the driving signal output terminal of the path selection module 2 to the driving signal input terminal of the driving module 3. This connection ensures that the driving module 3 is able to receive the driving signal output from the path selection module 2. The driving signal is a key signal to adjust display characteristics of the LED lamp module 1 such as brightness and color, and the frequency and duty cycle of the signal directly affect the display effect of the LED lamps. After receiving the driving signal, the driving module 3 applies these signals to various channels of the corresponding LED lamp module 1 through a plurality of internal driving units, so as to realize the accurate display operation of the LED lamp module 1.

In summary, the path selection module 2 acquires the lamp bead type data and adaptive voltage data in real time through the connection with the signal input and output terminals of the LED lamp module 1, ensuring that suitable driving signals can be generated. Then, the driving module 3 controls the display operation of the LED lamp module 1 according to these driving signals, ensuring the stable operation of the lamp beads under different voltage and brightness requirements. This complete circuit structure ensures the efficient, stable and accurate display effect of the LED lamp module 1 in different environments through reasonable signal and power management.

In conclusion, the adaptive control of intelligent driving of the LED lamps is achieved by introducing the path selection module 2, combining data interaction with the cloud platform and intelligent signal processing. Firstly, the path selection module 2 can acquire the lamp bead type data, including information such as a color channel and a power demand, of the LED lamp module 1 in real time, and interact with the cloud platform through data communication to dynamically acquire adaptive voltage data so as to ensure that the driving voltage matches the LED lamp module 1. Secondly, through the driving signal generation mechanism of the path selection module 2, the lamp bead type data and the adaptive voltage data are input to the driving signal generation algorithm model, and the accurate driving signal is generated according to the characteristics of the LED lamps, so as to optimize the brightness adjustment, color temperature control and current distribution, so that the driving circuit can be flexibly adapted to the LED lamp module 1 with different specifications. Furthermore, through the signal linkage with the path selection module 2, the driving module 3 can dynamically adjust the driving path according to the demands of different lamp beads, and select an appropriate driving IC and channel combination, thereby avoiding the dependence of the traditional driving circuit on the fixed LED lamp configuration. Thus, the adaptation, stability and energy efficiency of the system can be improved, the hardware adjustment and maintenance costs caused by the LED lamp replacement or specification change can be reduced, and the adaptability and scalability of the adaptive intelligent driving circuit for the LED lamps can be significantly improved.

Further, as shown in FIG. 7, the LED lamp module 1 includes a lamp bead LED1, a diode D1 and a resistor R1, where an anode of the diode D1 is connected to the power supply, a cathode of the diode D1 is connected to a power input terminal of the lamp bead LED1, and the resistor R1 is connected between the power input terminal of the lamp bead LED1 and the power supply.

In the present embodiment, in the adaptive intelligent driving circuit for the LED lamps, the LED lamp module 1 includes the lamp bead LED1, the diode D1 and the resistor R1, and the connection relationship between these structural parts constitutes a power supply and current regulation loop of the LED lamp module 1. Firstly, the anode of the diode D1 is connected to the power supply, which means that the diode D1 functions as a protection element located at an input terminal of the power supply and controlling current unidirectional conduction. When the voltage is supplied by the power supply, the anode of the diode receives the current, so as to ensure that the current can correctly flow to the LED lamp bead LED1, thereby avoiding the damage to the LED lamp module 1 caused by reverse current. The cathode of the diode D1 is connected to the power input terminal of the LED1 lamp bead, which means that the cathode of the diode D1 transmits a current to the power input terminal of the LED lamp bead LED1. As a load, the LED lamp bead LED1 receives power and converts the power into light energy, providing illuminating or display functions. The cathode of the diode D1 serves not only as a key link for current direction control, but also ensures the normal operation of the LED lamp bead LED1, and at the same time avoids the influence of the reverse current on the circuit. Further, the resistor R1 is connected between the power input terminal of the LED1 lamp bead and the power supply. The function of the resistor R1 here is to limit the current, ensuring that the current flowing into the LED lamp bead LED1 remains within a safe range. If the current is too high, the LED lamp beads may be damaged due to overheat or service life of the LED lamp beads may be affected. The resistor R1 limits the current flowing into the LED lamp bead LED1 through its resistance value, so as to enable the LED lamp bead LED1 to operate within a predetermined safety range. In this way, the stable operation of the LED lamp bead can be ensured and the LED lamp bead can be prevented from excessive brightness or being damaged due to excessive current. On the whole, the diode D1, the LED lamp bead LED1 and the resistor R1 cooperate to constitute foundational circuitry of the LED lamp module 1, so as to ensure correct transmission of the current from the power supply and unidirectional flow of the current. In this way, the magnitude of the current can be controlled by the resistor R1, so that the LED lamp beads can be protected, the service life of the LED lamp bead can be prolonged and the reliability of the system can be improved. This circuit design provides stable voltage and current input, ensures the normal display operations of the LED lamp beads, improves the safety and stability of the LED lamp module, avoids the short service life caused by current fluctuation, and improves the reliability of the driving system.

Further, as shown in FIG. 7, a capacitor C1 and a capacitor CA1 are connected between the cathode of the diode D1 and the ground.

In the present embodiment, the capacitor C1 and the capacitor CA1 connected between the cathode of the diode D1 and grounding terminal function to ensure the stability and anti-interference capability of the circuit, in particular in terms of power supply stability and signal filtering. First, the capacitor C1 and the capacitor CA1 act as a filter to ensure that the circuit is not affected by high-frequency noise or power fluctuation during operation. The capacitor C1 and the capacitor CA1 are connected between the cathode of the diode D1 and ground, so that a filter circuit may be formed in the power supply loop. The capacitors are mainly used to smooth out voltage fluctuations, absorb high-frequency noise from the power supply, and reduce interference of these noises to the LED lamp module 1 and other sensitive circuit components. The capacitor C1 mainly functions to filter out high-frequency clutter or pulse signals in the power supply through charge and discharge characteristics thereof, so that a stable power can be supplied. The capacitor C1 provides a low impedance path for high-frequency signals to mitigate voltage noise interference affecting the LED lamp module 1 and associated circuitry. As a polarized capacitor, the capacitor CA1 has positive and negative polarities and has to be connected correctly according to the polarities. Typically used in filtering and voltage regulator circuits, polarized capacitors exhibit enhanced reverse voltage capability. Here, the capacitor CA1 may be used for further voltage regulation, in particular for filtering out voltage fluctuations across extended frequency ranges. The polarity requirement of the capacitor CA1 is required to enable it to operate effectively in prescribed current flow directions, ensuring efficient and stable operation of the circuit. The configuration of these two capacitors, especially the use of the capacitor CA1 as a polarized capacitor, can enhance the voltage regulation effect of the power supply and improve the performance of the LED lamp module 1. During high-frequency signal processing, the anti-interference ability of the circuit can be enhanced, and luminance instability or flicker phenomenon caused by power supply noise or other high-frequency signals can be suppressed effectively.

Figure 6:
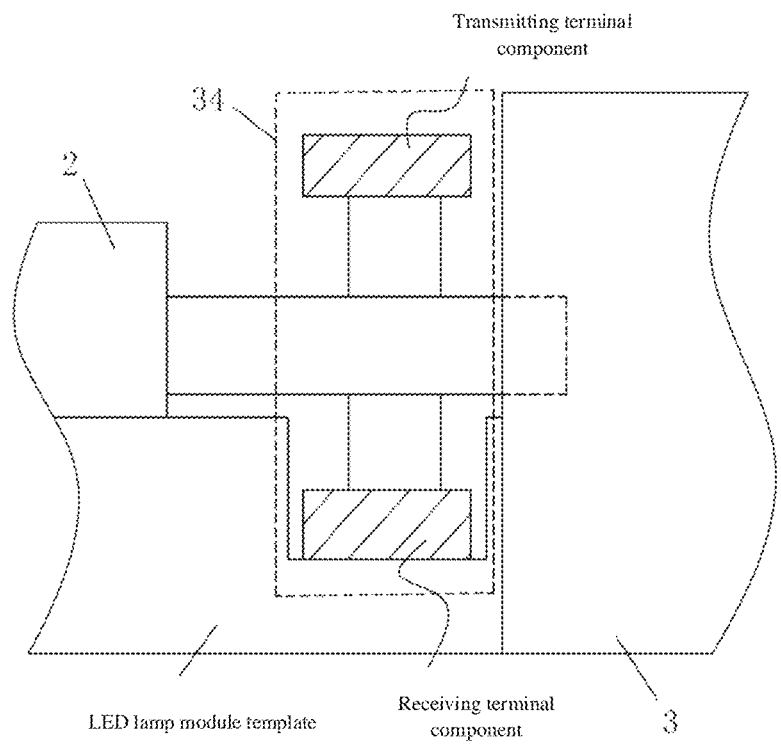
FIG. 6 is a simple schematic structural diagram showing an acquisition node in the adaptive intelligent driving circuit for the LED lamps according to an embodiment of the present application.

Further, as shown in FIGS. 6 and 7, the driving module 3 includes a plurality of driving units each including a driving chip 31 and a power input subunit 32. A first power input terminal of the driving chip 31 is connected to the power output terminal of the LED lamp module 1 via one or more first unit resistors 33. An end of each of the first unit resistors 33 close to the power output terminal of the LED lamp module 1 is provided with an acquisition node 34. The acquisition node 34 is connected to an acquired signal input terminal of the path selection module 2, and a grounding terminal of the driving chip 31 is grounded. A power input terminal of the power input subunit 32 is connected to a cathode of the diode D1, and a power output terminal of the power input subunit 32 is connected to a second power input terminal of the driving chip 31.

In the present embodiment, the driving module 3 may include a plurality of driving units each including the driving chip 31 and the power input subunit 32, which cooperate to ensure a stable supply of driving voltage and current for the LED lamp module 1.

The first power input terminal of the driving chip 31 is connected to the power output terminal of the LED lamp module 1 by the provided one or more first unit resistors 33. The function of this connection mode is that the power output terminal supplies power to the driving chip 31, and at the same time, the first unit resistor 33 serves to limit the current, so as to ensure that the current flowing to the driving chip 31 does not exceed a preset value, thereby preventing the driving chip 31 from being damaged or the circuit from being unstable due to excessive current. The setting of the resistor is crucial for the regulation of the power, which can provide a certain current stability, especially in case of load fluctuations. Furthermore, the resistance value of the resistor needs to be designed according to the operating characteristics of the LED lamp module 1 and the driving chip 31, so as to ensure normal operation.

The acquisition node 34 provided at the end of each of the first unit resistor 33 close to the power output terminal of the LED lamp module 1 is used to monitor current or voltage changes of the power supply in real time and to feed back measured voltage or current information to the path selection module 2. In this way, the path selection module 2 is able to determine the operating state of the LED lamp module 1 (e.g., whether the voltage is stable, whether the current is overloaded, etc.) based on these real-time data. The connection of the acquisition node 34 ensures that the path selection module 2 is able to adjust the driving path according to the actual current and voltage, providing a more accurate control signal.

The grounding terminal of the driving chip 31 is grounded to ensure proper electrical connection of the driving chip 31 and provide a stable operating environment. The grounding configuration serves to establish a ground potential reference voltage for the driving chip 31, thereby ensuring the stable operation of the chip, and avoiding abnormal operation of the driving chip 31 caused by voltage instability or inconsistency.

The power input terminal of the power input subunit 32 is connected to the cathode of the diode D1, and the function of the power input subunit 32 herein is to draw current from the diode D1 and transfer the current to the driving chip 31. Under the unidirectional conduction characteristic of the diode D1, the current can only flow in a single direction, ensuring the correct direction of the current while preventing reverse current damage to the circuit. The power input subunit 32, which serves as a current regulator and a current divider, delivers a regulated current of the power supply to the subsequent driving chip 31.

The power output terminal of the power input subunit 32 is connected to the second power input terminal of the driving chip 31, and further provides a stable voltage input required for the driving chip 31. This connection ensures that the driving chip 31 receives the power signal with a reasonable and stable voltage level, so that the chip is able to operate as set. The driving chip 31 adjusts a driving signal according to the received voltage to drive different channels of the LED lamp module 1, so that the parameters such as brightness, color and color temperature of the LED lamp can be controlled precisely.

In summary, the various structural elements in the driving unit including power input subunit 32, driving chip 31, resistors and acquisition node 34 operate together to ensure a stable current supply, precise control and signal feedback mechanism from the power supply to the driving chip 31. The power input subunit 32 cooperates with the diode D1 through current regulation and protection, thereby avoiding current reversal problems. The acquisition node 34 provides important feedback data to the path selection module 2 to support dynamic adjustment of the driving signal, so that the LED lamp module 1 can achieve optimal driving signal under different operating conditions.

According to the above-mentioned technical solution, the adaptation capability of the driving module can be enhanced. By providing a plurality of driving units in the multi-channel driving module, and using a combination of the first unit resistor and the acquisition node, the path selection module can monitor the operating state of the LED lamp module in real time, and adjust the driving path according to the collected signal. Furthermore, the arrangement of the power input subunit enables the driving chip to obtain a suitable supplied voltage more efficiently, thereby improving the flexibility of the driving path and the adaptability of the LED lamp, and ensuring that different types of LED lamp modules can obtain accurate driving signals.

Further, as shown in FIG. 7, the power input subunit 32 includes a second unit resistor 321 (RV1, RV3 or RV5), a third unit resistor 322 (RV2, RV4 or RV6) and a unit capacitor 323 (C2, C3 or C4). A first end of the second unit resistor 321 is connected to the cathode of the diode D1, a second end of the second unit resistor 321 is connected to a first end of the third unit resistor 322, a second end of the third unit resistor 322 is grounded, and the second end of the second unit resistor 321 is grounded with the unit capacitor 323.

In the present embodiment, the power input subunit 32 includes the second unit resistor 321, the third unit resistor 322 and the unit capacitor 323, which operate together to regulate the current, smooth the voltage, and filter out noise in the power supply, ensuring stable operations of the driving chip 31 and the LED lamp module 1.

The connection between first terminal of the second unit resistor 321 and the cathode of the diode D1 ensures that the power input subunit 32 draws current from the diode D1. The diode D1 functions as a unidirectional conductor within the circuit, allowing current flow only from the anode to the cathode of the diode and preventing reverse current from affecting the circuit. The second unit resistor 321 serves to limit the current, preventing the circuit from being damaged due to the excessive current. The provided second unit resistor 321 is used to limit the current to a safe range to protect subsequent circuitry (e.g., a driving chip 31) from overcurrent.

The connection between the second end of the second unit resistor 321 and the first end of the third unit resistor 322 allows the second unit resistor 321 and the third unit resistor 322 to operate in series, further regulating the magnitude of the current. The connection between the third unit resistor 322 and the ground ensures that the current in the entire circuit will eventually return to ground potential, forming a complete current loop. The third unit resistor 322 divides the voltage and guides the current stably into the ground.

The second end of the third unit resistor 322 is grounded, which ensures that the circuit has a stable reference potential. By grounding the other end of the current loop, the circuit is able to maintain a steady current flow and avoid adverse effects due to current direction or voltage instability.

The unit capacitor 323 connected between the second terminal of the second unit resistor 321 and the ground acts as a filter and mainly functions to smooth out high-frequency noise or transient voltage fluctuations in the power input. Capacitors are able to absorb unwanted voltage fluctuations in the power supply as current flows and to release stored energy as the voltage of the power supply drops, thereby balancing the current flowing to subsequent circuits. The unit capacitor 323 helps to reduce noise from the power supply, improve stability of the power supply, ensure that the driving chip 31 receives a stable voltage, and avoid abnormal LED display or abnormal operation of the driving chip 31 due to voltage instability.

In summary, the power input subunit 32 effectively regulates the current and voltage through a combination of resistors and capacitors to ensure that the current does not exceed a set safe value and to filter out noise in the power supply to avoid interference from the power supply. The diode D1 functions as a unidirectional conductor, preventing the circuit from being damaged by reverse currents. By providing the second unit resistor 321, the third unit resistor 322 and the unit capacitor 323 in the power input subunit 32, the voltage division and filtering of the input voltage are achieved, so that the driving chip can obtain a relatively stable current input when receiving the power, and avoid the circuit to be damaged by the transient current impact. Therefore, the power supply stability of the driving system and the durability of the LED lamp beads are improved, the influence of the current fluctuation on the brightness uniformity of the LED is reduced, and the stability and reliability of the system are improved. Through these designs, the power input subunit 32 can provide stable and noise-free voltage input to the driving chip 31, guarantee the normal operation of the entire intelligent driving circuit for the LED lamp, and improve the reliability and stability of the circuit.

Figure 8:
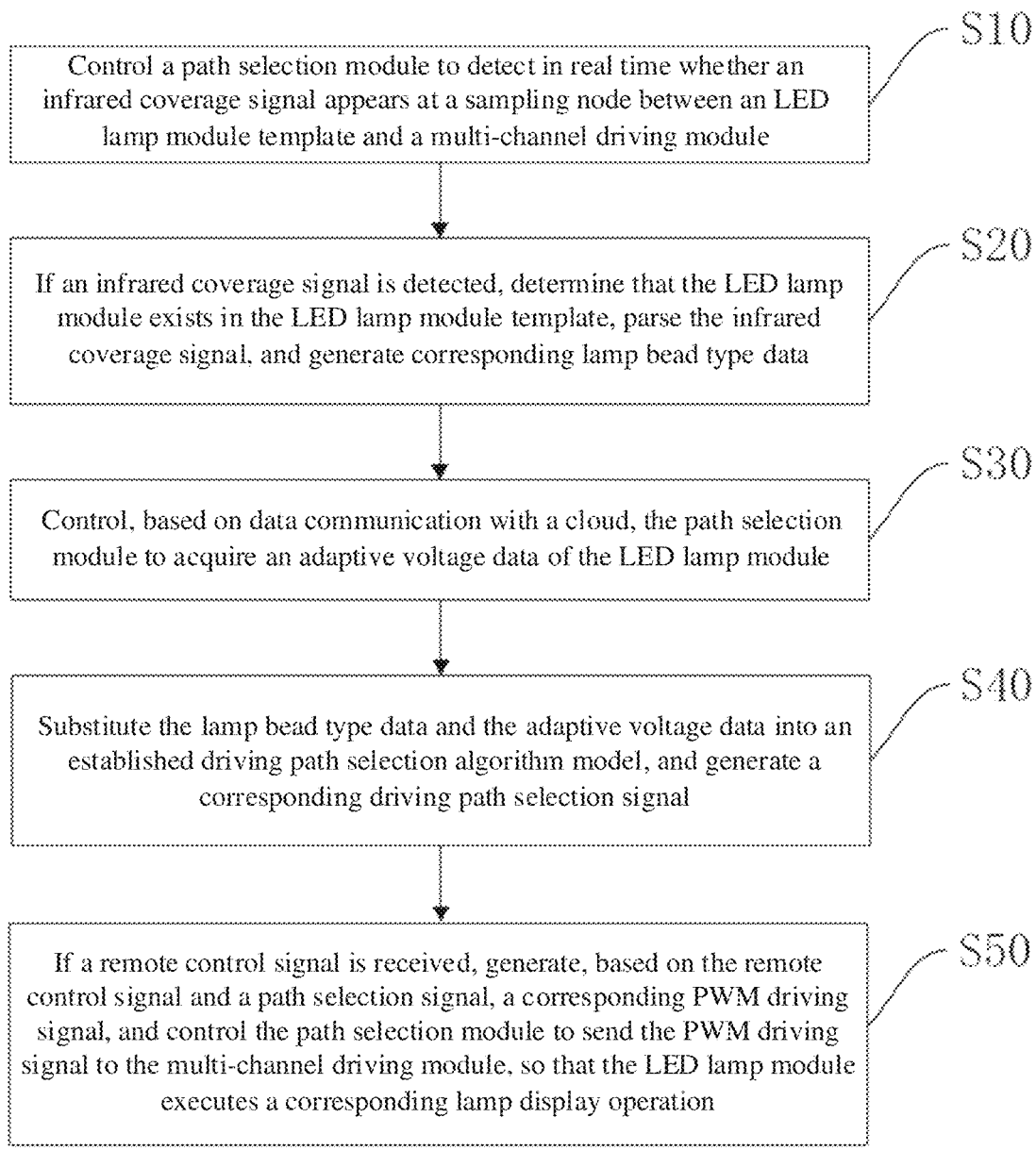
FIG. 8 is a flowchart showing an adaptive intelligent driving method for LED lamps according to an embodiment of the present application.

As shown in FIG. 8, an adaptive intelligent driving method for LED lamps is applied to the adaptive intelligent driving circuit for the LED lamps, and the adaptive intelligent driving method for the LED lamps includes:

S10, controlling the path selection module 2 to detect in real time whether an infrared coverage signal appears at an acquisition node between an LED lamp module template and the driving module 3. Specifically, by disposing a transmitting terminal and a receiving terminal of an infrared sensor between the LED lamp module 1 and the driving module 3, the path selection module 2 can establish an infrared signal transmission channel between these two terminals. Whenever a connection port between the LED lamp module 1 and the driving module 3 becomes obstructed, a change in intensity of the infrared signal will be detected by the path selection module 2. The path selection module 2 determines the presence and valid connection status of the LED lamp module 1 in real time by continuously monitoring a change of the infrared signal. When intensity of the obstructed signal reaches a preset detection threshold, the path selection module 2 may confirm successful engagement of the LED lamp module template and activate subsequent operational procedures.

S20, determining that the LED lamp module 1 is present in the LED lamp module template if the infrared coverage signal is detected, and parsing the infrared coverage signal to generate corresponding lamp bead type data. Specifically, upon the path selection module 2 confirming the detection of the infrared signal coverage, the system immediately performs a signal parsing function to parse signals received from the infrared sensor, and the signals contain lamp bead type information of the LED lamp module 1. The path selection module 2 identifies the type of lamp bead (e.g., RGB lamp bead, RGBW lamp bead, monochromatic lamp bead, etc.) based on the information, and converts information related to the identified type into lamp bead type data as a basis for subsequent driving signal generation. For example, if the infrared signal indicates that an RGBW lamp bead is connected, the module may record the characteristic that the lamp bead has four control channels (red, green, blue and white), so as to provide data support for subsequent control strategies.

S30, controlling the path selection module 2 to acquire adaptive voltage data of the LED lamp module 1 based on data communication with the cloud platform. Specifically, the path selection module 2 is connected to the cloud platform via a wireless communication module (such as Wi-Fi or Bluetooth), and requests adaptive voltage data of the LED lamp module 1 from the cloud. Voltage demand data corresponding to different LED lamp modules 1 are stored in the database in the cloud platform, and the path selection module 2 acquires these data through a communication interface with the cloud platform so as to ensure that the selected voltage matches the operating voltage of the LED lamp module 1. For example, if the LED lamp module 1 operates at a voltage of 12V, the path selection module 2 may acquire voltage adaptation information of 12V from the cloud platform and provide a reference for the generation of a subsequent driving signal.

S40, inputting the lamp bead type data and the adaptive voltage data into an established driving path selection algorithm model to generate corresponding driving path selection signals. Specifically, the path selection module 2 inputs the lamp bead type data and the adaptive voltage data acquired from the LED lamp module 1 into a pre-established driving path selection algorithm model. This model may determine an optimal driving path according to a comprehensive calculation of lamp bead type and voltage demands. For example, for an RGBW lamp bead, the path selection algorithm may need to select a driving path that supports four channels, and calculate a driving duty cycle for each channel according to an adaptive voltage (e.g., 12V). In this way, the path selection module 2 is able to generate driving path selection signals that are adapted to different characteristics and voltage requirements of the LED lamp module 1, ensuring that the LED lamp module 1 is able to obtain the most suitable driving current and voltage.

S50, if a remote control signal is received, generating, based on the remote control signal and a path selection signal, a corresponding driving signal, and controlling the path selection module 2 to transmit the driving signal to the driving module 3 so as to enable the LED lamp module 1 to perform corresponding lamp display operations. Specifically, the path selection module 2, after receiving a remote control signal transmitted from a remote controller, decodes the remote control signal to determine the brightness, color and other display attributes required by the user, and calculates a corresponding driving signal based on these requirements in combination with the previously generated path selection signal. The path selection module 2 controls the brightness, color temperature or color of the LED lamp module 1 by adjusting the duty cycle and the frequency of the driving signal. Finally, the generated driving signal is transmitted to the driving module 3 via the path selection module 2, and the driving module 3 drives the corresponding LED lamp module 1 according to the received driving signal, so as to ensure that the LED lamps perform corresponding display operations according to the remote control demands of the user, such as changing the color and brightness, or switching a display mode. In summary, the intelligent LED driving control can be achieved, the path selection module 2 can detect whether the LED lamp module 1 is installed in real time, parses the infrared coverage signal, and obtain the adaptive voltage of the LED lamp by combining with the data from the cloud platform, so that the system can automatically match the driving path, avoiding the dependence of the traditional driving system on the fixed voltage and the fixed lamp bead type. Therefore, the automation degree and adaptability of the driving system are improved, the complexity of manual configuration is reduced, and the system can dynamically adjust the driving mode according to different LED lamp modules 1, and the intelligent control ability is improved.

Figure 9:
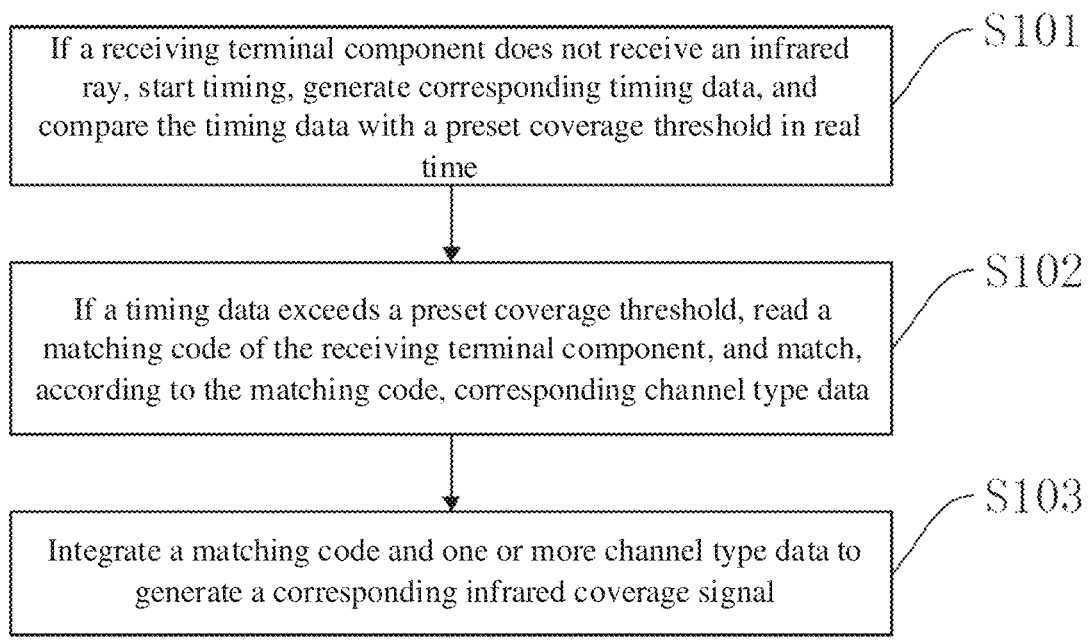
FIG. 9 is a flowchart for implementing step S10 in the adaptive intelligent driving method for the LED lamps according to an embodiment of the present application.

In an embodiment, as shown in FIGS. 6 and 9, in step S10, i.e., in the step of detecting by the path selection module 2 in real time whether an infrared coverage signal appears in a acquisition node between the LED lamp module template and the driving module 3, the upper and lower sides of the acquisition node are respectively provided with a transmitter component and a receiver component of an infrared sensing element, and the infrared coverage signal is a signal generated when a channel port of the LED lamp module 1 connected to the driving module 3 is irradiated infrared rays from the transmitter component and the receiver component, and the step further includes:

S101, if a receiver component fails to receive the infrared rays, starting timing to generate corresponding timing data, and comparing the timing data and a preset coverage threshold in real time. Specifically, the path selection module 2, upon detecting that the receiver component has not received infrared rays of a predetermined intensity, will start one timer and continuously record the time to generate timing data for determining the duration of the signal obstruction. The timing data is continually compared to a preset coverage threshold, which is a predetermined maximum time value that indicates whether the obstructed signal has exceeded an allowable time within a valid detection range. When the timing data exceeds the preset threshold value, the path selection module 2 determines that the obstruction of the signal is valid and continuous, thereby initiating subsequent operational procedures.

S102, if the timing data exceeds the preset coverage threshold, reading a matching code of the receiver component, and matching corresponding channel type data according to the matching code. Specifically, when the timing data exceeds the preset coverage threshold, the path selection module 2 may read the matching code from the receiver component, which is a piece of data relating to the characteristic of the channel to which the LED lamp module 1 is connected, and the code is used to uniquely identify the type of the channel. For example, if the received matching code corresponds to the red channel of the RGB configuration, the path selection module 2 can confirm that it is the LED lamp module 1 configured for the red channel. According to the read matching code, the path selection module 2 searches for and matches the channel type data corresponding to the code through an internal database or a preset rule, and these data do not include voltage information, but represent different channel types of the LED lamps, such as an R channel, a G channel, a B channel, a WW channel, a CW channel and the like.

S103, integrating the matching code and one or more piece of channel type data to generate a corresponding infrared coverage signal. Specifically, the path selection module 2 combines the matching code read from the receiver component with the channel type data matched from the database or rules to form a complete infrared coverage signal. This infrared coverage signal carries the type information of the channel to which the LED lamp module 1 is connected, such as the red channel or a cool white channel determined as RGB. This signal will then be passed to the path selection module 2 for further decision-making regarding the generation and routing of driving signals so that the LED lamp module 1 is able to perform correct display operations according to its corresponding channel type, such as outputting different colors of light according to the RGB channel, or adjusting the color temperature according to the WW and CW channels.

According to the above-mentioned technical solution, the reliability and identification accuracy of the infrared signal can be enhanced. By providing the transmitter component and the receiver component of the infrared sensing element, and monitoring the infrared signal obstruction by using the timing mechanism, the system can accurately determine the installation state of the LED lamp module, and acquire the corresponding channel type data in combination with the matching code, so as to ensure that the driving system can be adjusted according to the actual installation condition. In this way, the installation and detection accuracy of the LED lamp module can be improved, the erroneous or omission determination can be avoided, and the intelligent level and automatic adaptability of the system can be improved.

Figure 10:
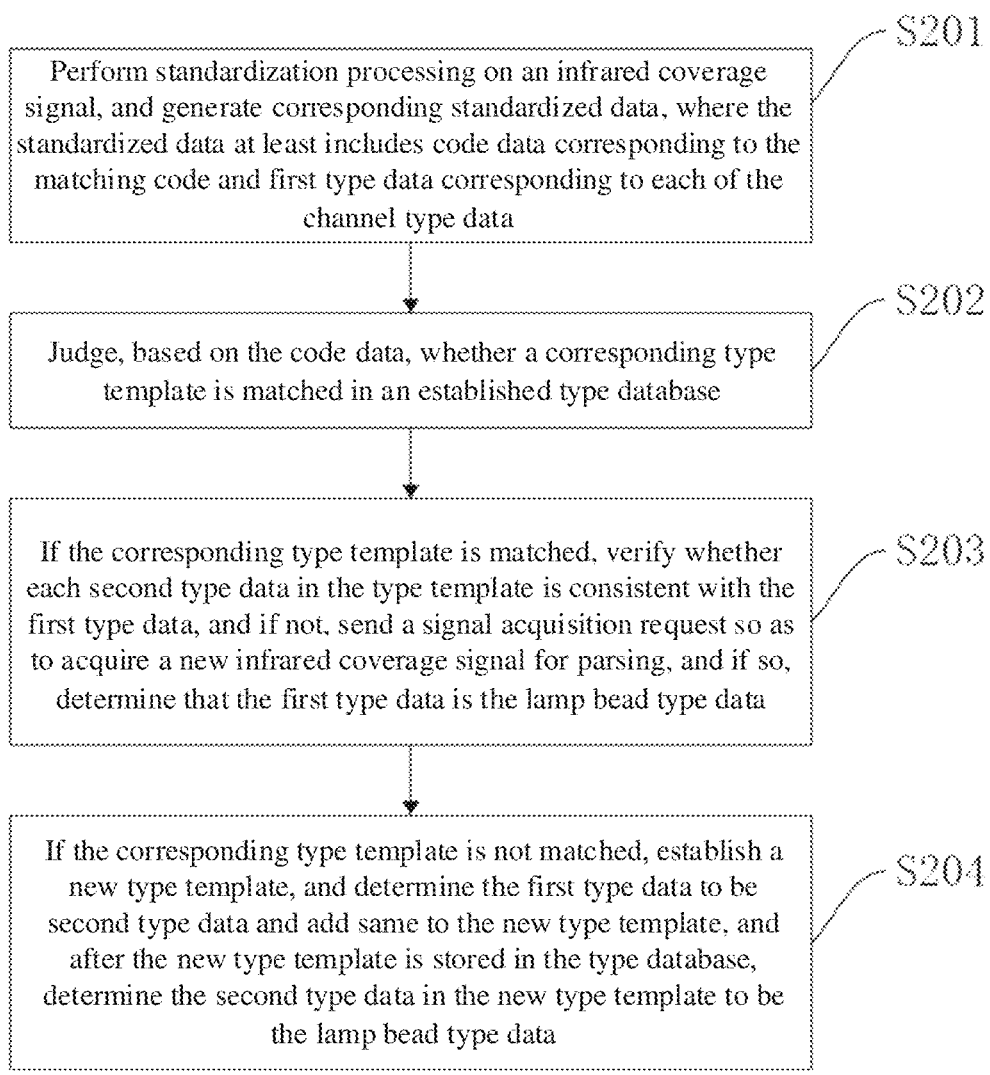
FIG. 10 is a flowchart for implementing step S20 in the adaptive intelligent driving method for the LED lamps according to an embodiment of the present application.

In an embodiment, as shown in FIG. 10, in step S20, i.e., the step of parsing the infrared coverage signal to generate corresponding lamp bead type data includes:

S201, standardizing the infrared coverage signal to generate corresponding standardized data, wherein the standardized data at least includes code data corresponding to the matching code and first type data corresponding to each piece of the channel type data. Specifically, upon receipt of the infrared coverage signal, the path selection module 2 standardizes the signal to convert the signal to have a format that can be processed. These standardized data includes at least: code data corresponding to the matching code, where the data represents a channel type of the LED lamp module 1, such as an R channel, a G channel, a B channel and the like; and the first type data associated with each piece of channel type data that contains specific attributes of the channel, such as current requirements, and brightness adjustment range of the channel. The purpose of the standardizing is to convert this information to have a uniform format for subsequent matching and processing.

S202, determining, based on the code data, whether a corresponding type template is matched in an established type database. Specifically, the path selection module 2 searches for a corresponding type template in a pre-established type database according to the standardized code data. The type database stores template data for different channel types (e.g., RGB, RGBW, etc.), with each template containing a set of detailed attributes associated with the channel types. When the path selection module 2 looks up from the code data, the code data may be compared with the templates in the database to determine if there are type templates that match the code data. For example, if the code data to which the infrared signal corresponds is "red channel", the path selection module 2 will attempt to find a template representing the red channel in the database and match it with the current code.

S203, if the corresponding type template is matched, verifying whether second type data in the type template is consistent with the first type data, if inconsistent, transmitting a signal acquisition request to acquire a new infrared coverage signal for parsing, and if consistent, determining the first type data as the lamp bead type data. Specifically, after finding the matching template, the path selection module 2 may continue to verify whether the second type data in the template is consistent with the first type data. The second type data typically represents a predetermined characteristic of the channel, such as current range and brightness demands. If the second type data matches the first type data, the module may determine this is valid lamp bead type data, and continue to execute subsequent operations. If there is no match, it indicates that the current signal or data does not meet the expectation, and the path selection module 2 may transmit a request to acquire a new infrared coverage signal, so as to re-parse and determine the accurate lamp bead type data.

S204, if no corresponding type template is matched, establishing a new type template and assigning the first type data as the second type data to the new type template, and after the new type template is stored in the type database, determining the second type data in the new type template as the lamp bead type data. Specifically, when the path selection module 2 fails to find a matching type template in the database, the path selection module 2 may establish a new type template that contains the first type data and the first type data may be identified as the second type data. In this way, the new template can be matched to the type of the current LED lamp module 1, and the new template data can be stored in the type database for subsequent use. In this process, the path selection module 2 not only ensures the adaptation of the LED lamp module 1, but also can dynamically update the database according to the new data, so that the system can adapt to the new type of the LED lamp module 1, thereby ensuring the drive adaptability of the system to different lamp bead types.

According to the above-mentioned technical solution, the analysis accuracy and self-learning ability of the lamp bead type data can be improved, by standardizing the infrared coverage signal and matching it with the existing template in the type database, the system can automatically recognize different types of LED lamp beads, and establish a new type template when the matching fails, so that the system has the self-adaptive learning ability. Therefore, the adaptive ability and data matching efficiency of the system are improved, the recognition failure caused by the missing database is avoided, and the adaptation and expansibility of the system in different LED lamp environments are improved.

Figure 11:
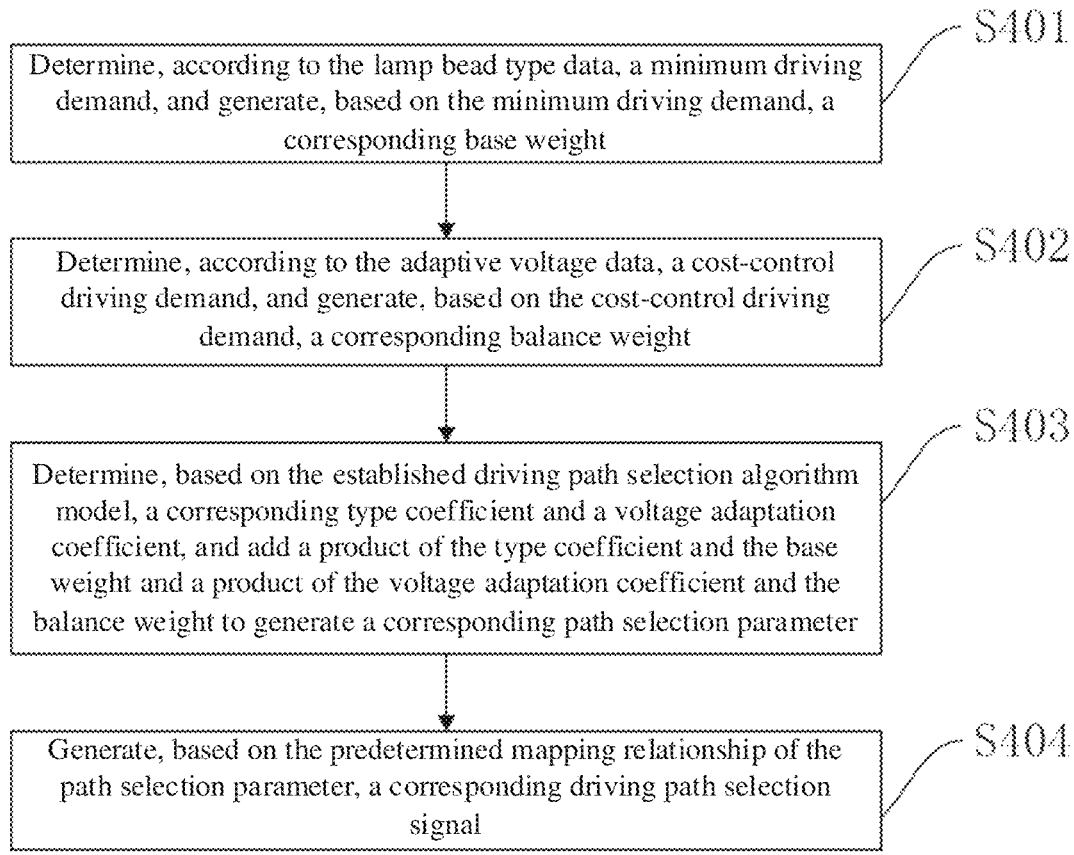
FIG. 11 is a flowchart for implementing step S40 in the adaptive intelligent driving method for the LED lamps according to an embodiment of the present application.

In an embodiment, as shown in FIG. 11, in step S40, i.e., the step of inputting the lamp bead type data and the adaptive voltage data into an established driving path selection algorithm model to generate the corresponding driving path selection signal includes:

S401, determining a minimum driving demand according to the lamp bead type data, and generating a corresponding base weight based on the minimum driving demand. Specifically, the path selection module 2 determines the basic driving demand of the lamp bead according to the lamp bead type data acquired from the LED lamp module 1, and the minimum driving demand includes parameters such as current, voltage and power. According to the lamp bead type (e.g., RGB, RGBW, etc.), the path selection module 2 may set a current demand and a voltage demand each having a minimum value to determine the minimum driving demand and translate this demand into the corresponding base weight. This base weight reflects the basic current and voltage requirements of the lamp bead under minimum operating conditions, and serves as a basis for subsequent driving path selection and signal generation to ensure that the driving path selection does not exceed the minimum required range of the LED lamp module 1.

S402, determining a cost-control driving demand according to the adaptive voltage data, and generate a corresponding balance weight based on the cost-control driving demand. Specifically, the path selection module 2 evaluates the driving costs at different voltages by obtaining the adaptive voltage data of the LED lamp module 1. According to the voltage requirements, the path selection module 2 determines whether cost-optimization potential exists under different adaptive voltage conditions. For example, the power consumption may be reduced by reducing the supplied voltage, but the complexity of the driving signals may need to be increased. Based on these voltage data, the path selection module 2 calculates a driving demand associated with the voltage adaptation, and the driving demand reflects the optimum operating balance under the current voltage conditions. Then, this demand is converted into a balance weight used as the basis for adjusting the current and voltage ratio in the subsequent driving path selection, so as to ensure that the maximum cost-effectiveness is achieved while complying with the voltage adaptation.

S403 determining, based on the established driving path selection algorithm model, a corresponding type coefficient and a voltage adaptation coefficient, and adding a product of the type coefficient and the base weight and a product of the voltage adaptation coefficient and the balance weight to generate corresponding path selection parameters. Specifically, the path selection module 2 calculates a type coefficient for the lamp bead type according to an existing driving path selection algorithm model, and the type coefficient represents the driving characteristics of different types of lamp beads. For example, an RGB lamp bead may require more current and a monochromatic lamp bead is relatively simple. Then, the path selection module 2 calculates a voltage adaptation coefficient for the voltage adaptation, and the voltage adaptation coefficient reflects the adjustment of the driving demands of the LED lamp module 1 under specific voltage conditions. Thereafter, the path selection module 2 performs multiplication operation on the type coefficient and the base weight to obtain a driving demand intensity under the lamp bead type, and then performs multiplication operation on the voltage adaptation coefficient and the balance weight to obtain the optimization demand under the voltage. Finally, the two products are added to obtain a comprehensive path selection parameter, and this parameter is a key basis in driving path selection, so as to ensure that the current and voltage of the lamp bead satisfy the optimization requirements.

S404, generating, based on the predetermined mapping relationship of the path selection parameters, a corresponding driving path selection signal. Specifically, the path selection module 2 selects the most suitable driving path by comparing the calculated path selection parameters using a preset path selection parameter mapping relationship. This mapping relationship contains the corresponding relationship between different path parameters and corresponding driving paths, which ensures that when the path selection parameters are determined, the module can quickly find the optimal driving path. For example, if one path parameter indicates a low power consumption drive, the system will select a corresponding low power consumption path. However, if another path parameter indicates a higher power drive is required, the system will select a high power path. Finally, the path selection module 2 generates a specific driving path selection signal, which is transmitted to the driving module to ensure that the LED lamp module 1 obtains an optimal driving signal to perform corresponding lamp display operations.

Further, the path selection module 2 needs to evaluate the driving cost at different voltages by obtaining the adaptive voltage data of the LED lamp module 1. In practice, the LED lamp module 1 may have different adaptive voltage ranges, and in general, the selection of the voltage directly affects the power consumption and energy efficiency of the driving circuit. For example, a higher voltage may mean that current is easier to pass through the LED lamp bead, but may also result in higher power consumption and additional heat generation. However, a lower voltage may reduce power consumption, but may require more complex drive circuit designs to maintain stable brightness and color, or may require the use of higher-frequency driving signals. The path selection module 2 may evaluate the cost-effectiveness under different voltage conditions by analyzing these effects, and determine whether cost-optimization potential exists by adjusting the voltage. Based on these voltage data, the path selection module 2 can calculate the driving demands at the adaptive voltage, which not only include the basic demands of current and voltage, but also take into account the adjustments that have to be made in order to optimize cost and energy efficiency. For example, under low voltage conditions, it may be necessary to increase the switching frequency of the driving chip 31 to ensure that the LED lamp beads operate properly and maintain the desired brightness, while increasing the frequency may result in increased drive circuit complexity or decreased energy efficiency. Thus, the path selection module 2 may weigh the requirements and limitations under these voltage conditions to find the most appropriate driving demands. Thereafter, the path selection module 2 translates this driving demand into the balance weight, which reflects how to adjust the current to voltage ratio under existing voltage adaptation conditions. In this way, the brightness and performance requirements of the LED lamp module 1 can be satisfied, and energy consumption and complexity can be minimized. This balance weight is not only a reflection of the voltage adaptation conditions, but also provides a basis for subsequent driving path selection. In this process, the path selection module 2 may adjust the current and voltage distribution ratio among different paths according to this weight, to ensure that the system can not only ensure the stability of the driving signal, but also realize the optimization of energy efficiency and cost in actual operation. By accurately controlling the ratio of voltage and current, the path selection module 2 can ultimately achieve the best driving effect of the LED lamp module 1, while minimizing unnecessary energy consumption, and thus achieving the maximum cost-effectiveness.

For example, assuming that the path selection module 2 selects a driving path for a group of RGB LED lamp beads, it is found that the LED lamp beads provide sufficient brightness and color stability when operated at a voltage of 12V, but their power consumption is relatively high, whereas if the voltage is reduced to 9V, the power consumption will be significantly reduced. However, reducing the voltage requires increasing the complexity of the driving signal, e.g., increasing the frequency of the driving signal, to ensure that the LED lamp bead are still capable of maintaining a stable brightness. After evaluation, it is found from the path selection module 2 that although the driving signal complexity at 9V increases, the power consumption and heat dissipation effect of the overall system is better due to the improvement of energy efficiency, and by adjusting the current and voltage ratio, the system performance could be ensured to be unaffected. Therefore, the path selection module 2 may select the voltage of 9V as the adaptive voltage according to the evaluation result, and optimize the current distribution through the calculated balance weight, so that the display effect of the LED lamp bead can be maintained and energy can be saved by the driving signal, and thus the maximization of cost-effectiveness can be achieved.

According to the above-mentioned technical solution, the optimal driving path selection can be achieved. By calculating the minimum driving demand and the cost-control driving demand based on the lamp bead type data and the adaptive voltage data, and using the weight calculation method to generate the path selection parameter, the cost and energy efficiency of the system can be optimized while the driving effect can be ensured. Therefore, the energy efficiency management capability of the driving system is improved, the LED lamp module can be operated at appropriate voltage and power, the energy consumption is reduced, and the service life and stability of the drive circuit are improved.

Figure 12:
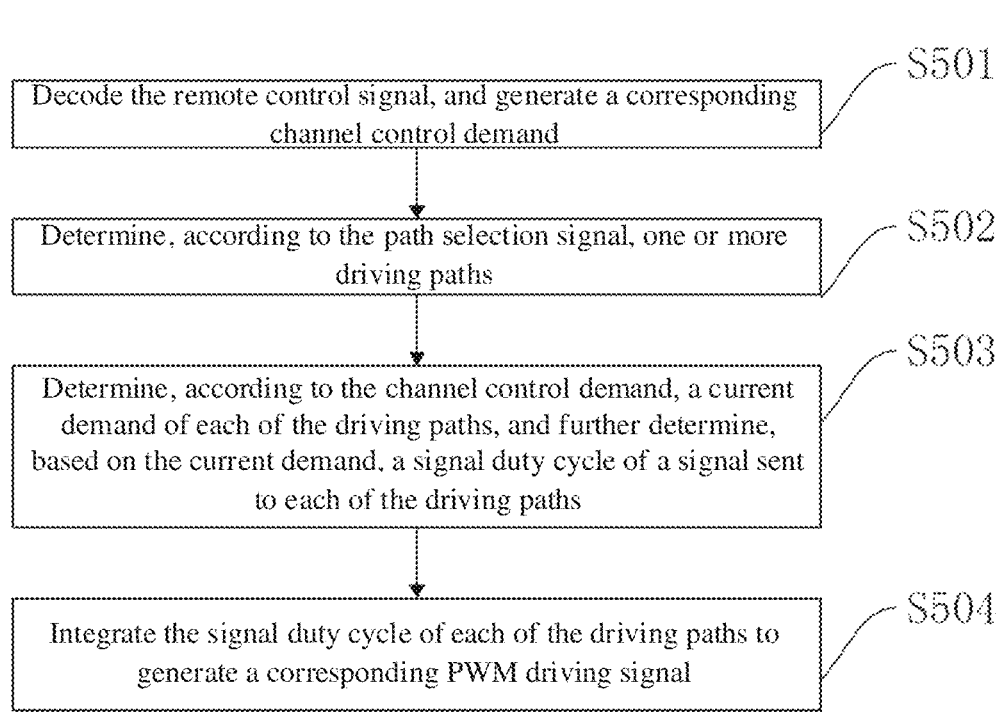
FIG. 12 is a flowchart for implementing step S50 in the adaptive intelligent driving method for the LED lamps according to an embodiment of the present application.
Figure 13:
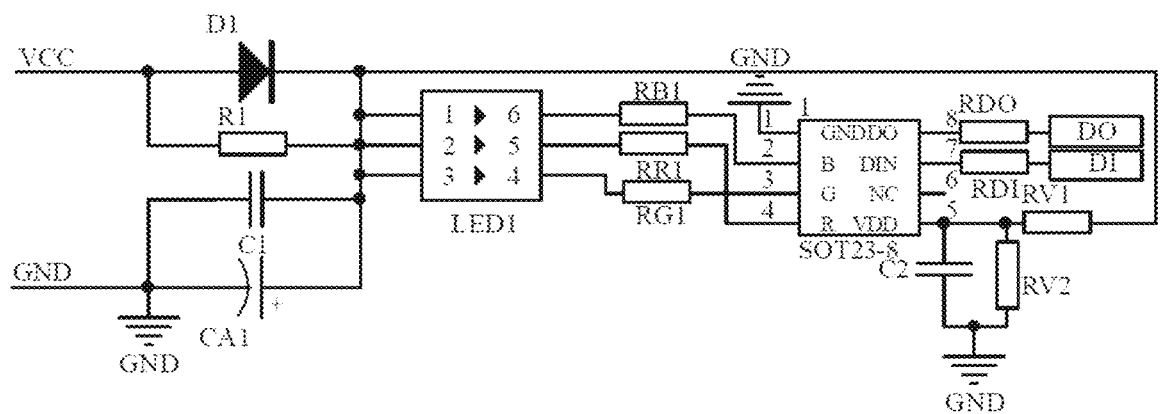
FIG. 13 is a partial schematic structural diagram showing a circuit of a 3-channel 1IC driving configuration in the adaptive intelligent driving circuit for the LED lamps according to an embodiment of the present application.
Figure 14:
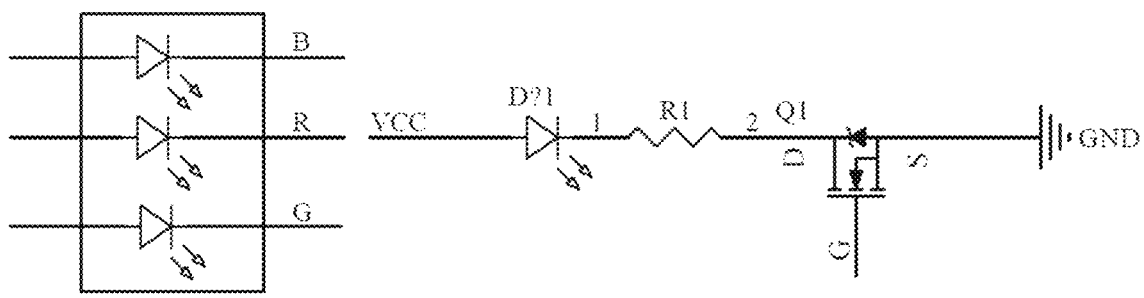
FIG. 14 is a partial schematic structural diagram showing a circuit of a 3-channel 1IC driving configuration with the lamp display units configured as 3V lamp beads in the adaptive intelligent driving circuit for the LED lamps according to an embodiment of the present application.
Figure 15:
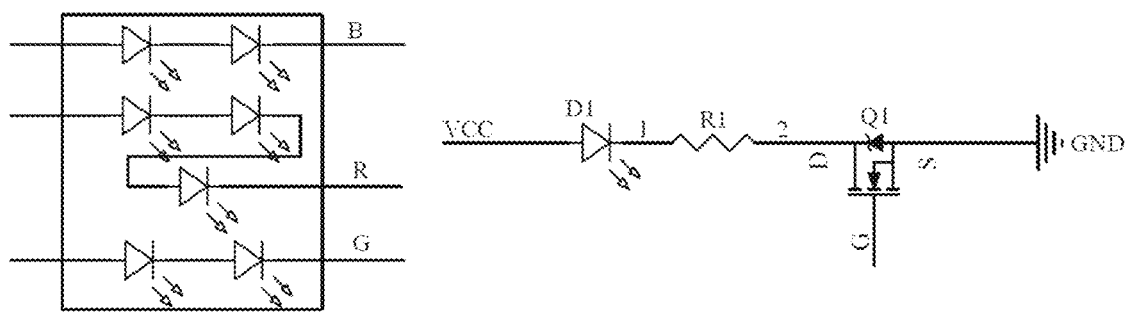
FIG. 15 is a partial schematic structural diagram showing a circuit of a 3-channel 1IC driving configuration with the lamp display units configured as 6V lamp beads in the adaptive intelligent driving circuit for the LED lamps according to an embodiment of the present application.
Figure 16:
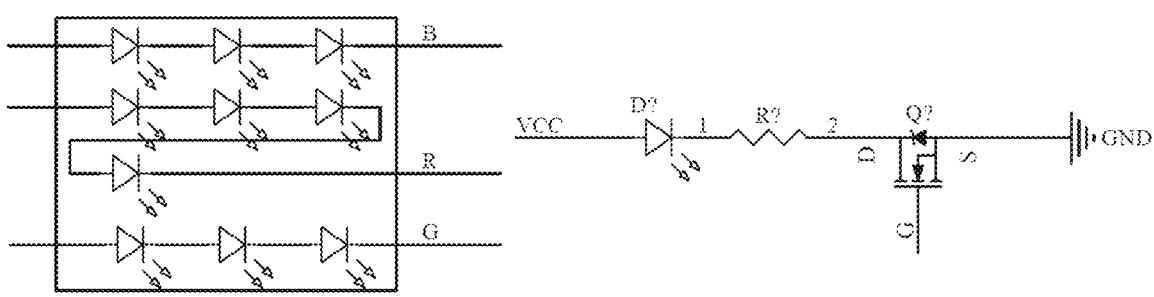
FIG. 16 is a partial schematic structural diagram showing a circuit of a 3-channel 1IC driving configuration with the lamp display units configured as 9V lamp beads in the adaptive intelligent driving circuit for the LED lamps according to an embodiment of the present application.
Figure 17:
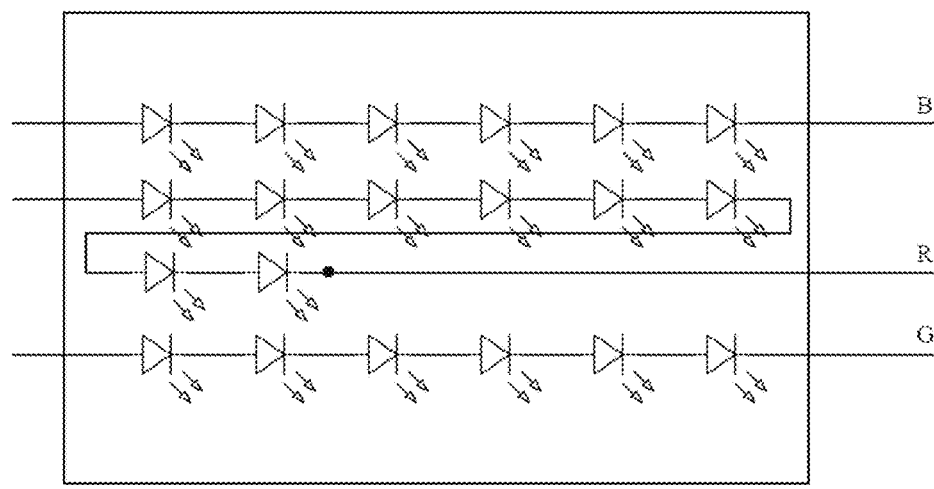
FIG. 17 is a partial schematic structural diagram showing a circuit of a 3-channel 1IC driving configuration with the lamp display units configured as 18V lamp beads in the adaptive intelligent driving circuit for the LED lamps according to an embodiment of the present application.
Figure 17:
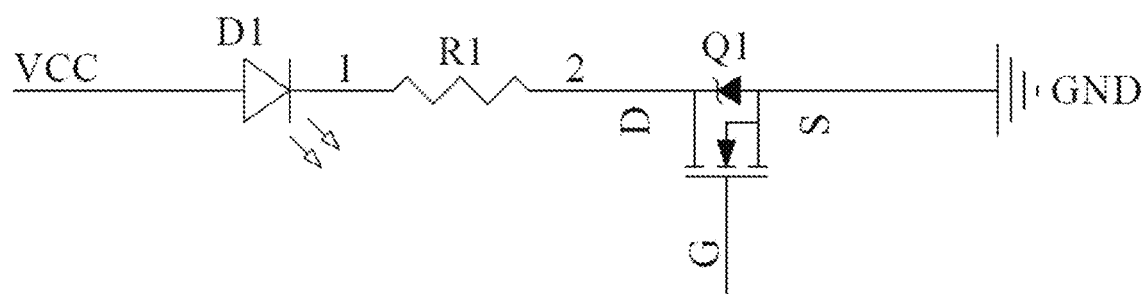
Figure 18:
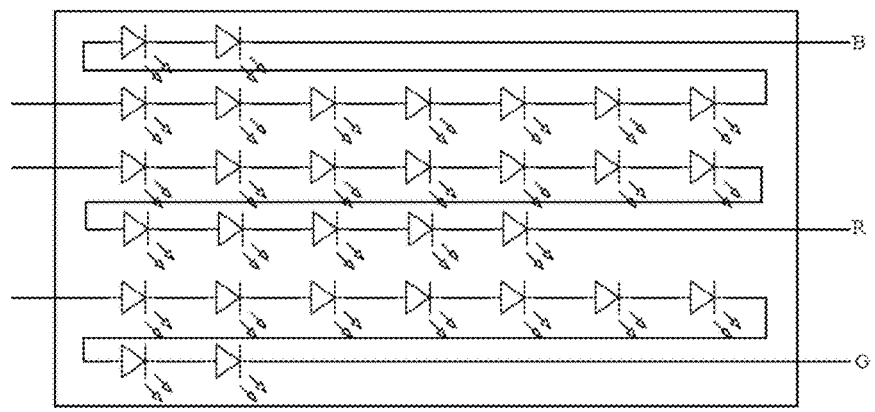
FIG. 18 is a partial schematic structural diagram showing a circuit of a 3-channel 1IC driving configuration with the lamp display units configured as 27V lamp beads in the adaptive intelligent driving circuit for the LED lamps according to an embodiment of the present application.
Figure 18:
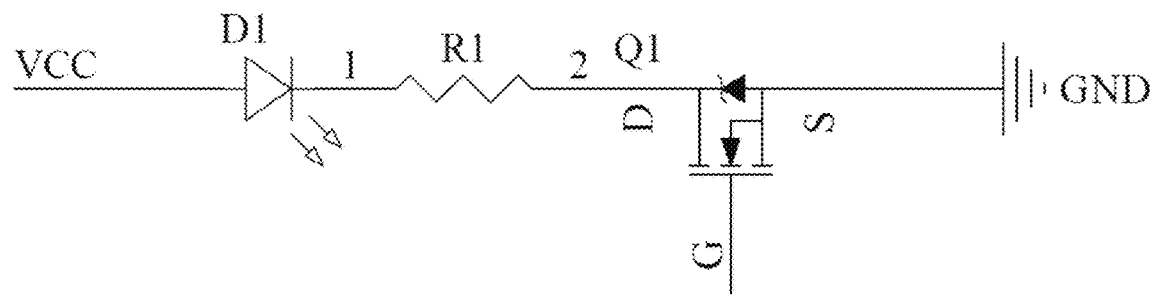
Figure 19:
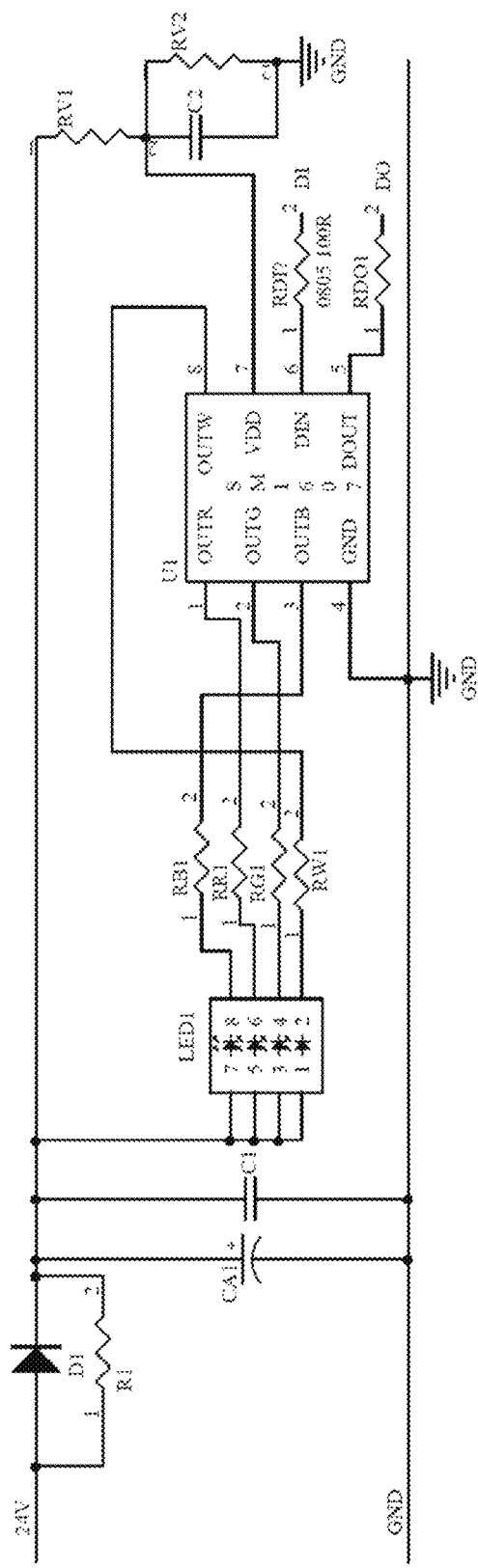
FIG. 19 is a partial schematic structural diagram showing a circuit of a 4-channel 1IC driving configuration with the lamp display units configured as 27V lamp beads in the adaptive intelligent driving circuit for the LED lamps according to an embodiment of the present application.
Figure 20:
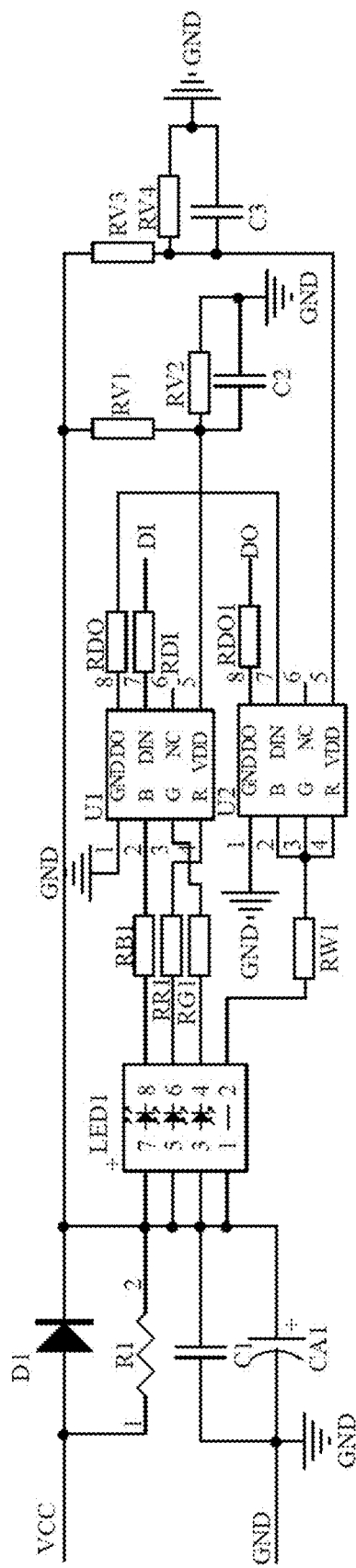
FIG. 20 is a partial schematic structural diagram showing a circuit of a 4-channel 2IC driving configuration in the adaptive intelligent driving circuit for the LED lamps according to an embodiment of the present application.
Figure 21:
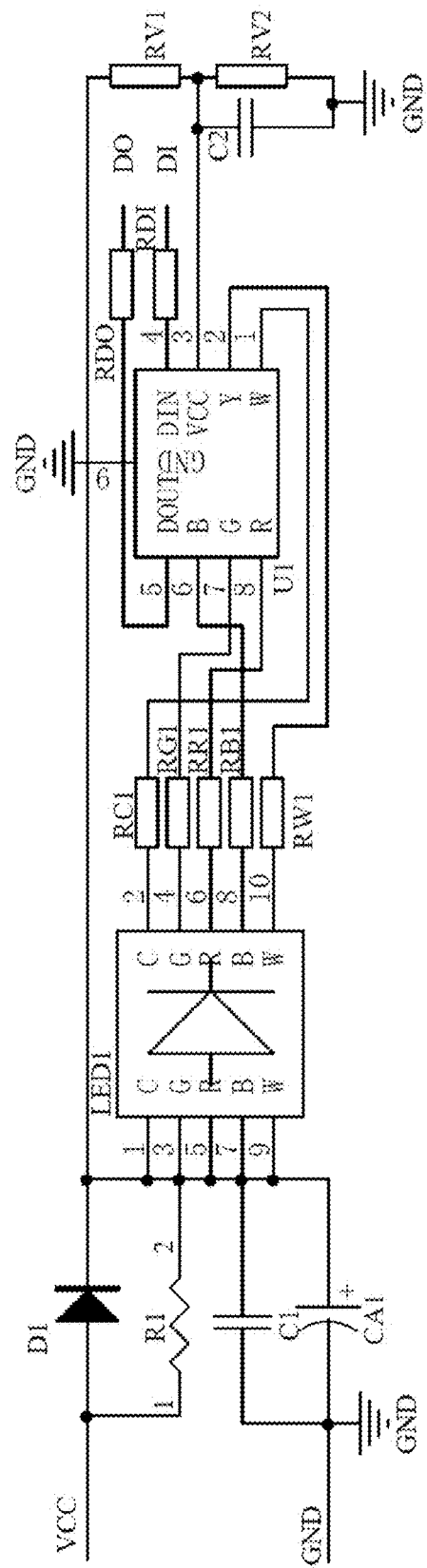
FIG. 21 is a partial schematic structural diagram showing a circuit of a 5-channel 1IC driving configuration in the adaptive intelligent driving circuit for the LED lamps according to an embodiment of the present application.
Figure 22:
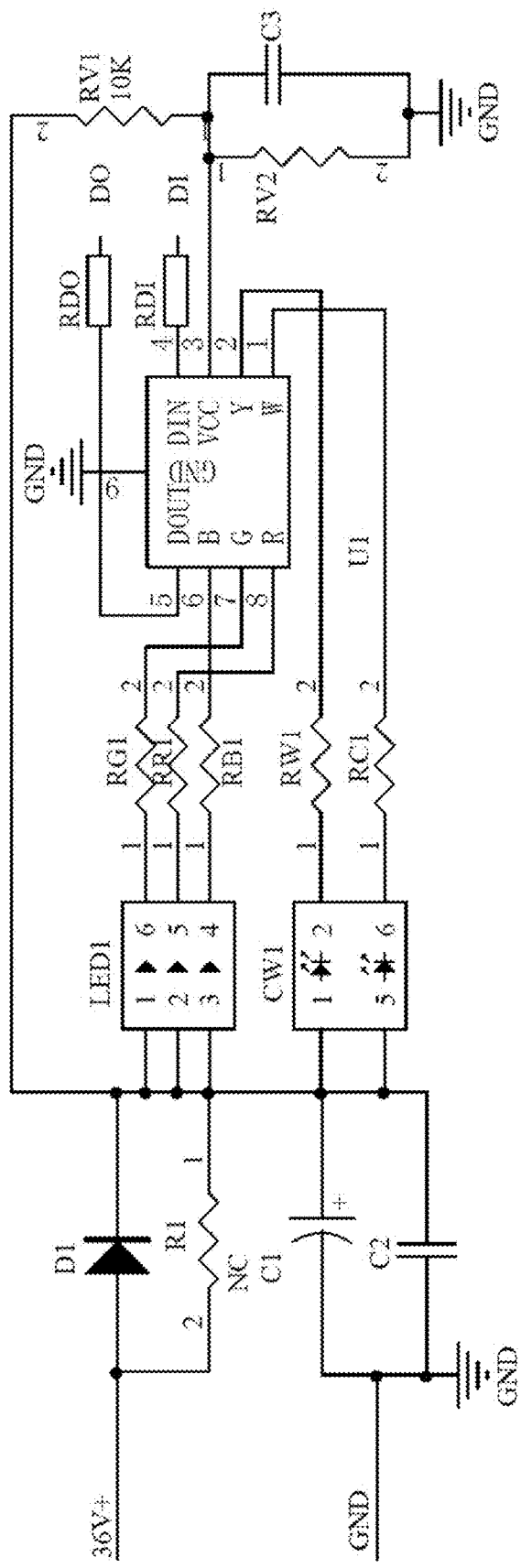
FIG. 22 is another partial schematic structural diagram showing a circuit of a 5-channel 1IC driving configuration in the adaptive intelligent driving circuit for the LED lamps according to an embodiment of the present application.

In an embodiment, as shown in FIG. 12, in step S50, i.e., the step of generating a corresponding driving signal based on the remote control signal and the driving path selection signal includes:

S501, decoding the remote control signal to generate a corresponding channel control demand. Specifically, when the remote control signal is received, the path selection module 2 extracts the user's control demands, which typically include parameters such as brightness, color, color temperature, etc. of the LED lamp module 1, by decoding the remote control signal. For example, the remote control signal may contain an instruction requesting adjustment of the brightness or an instruction to change the color of the LED lamp. The path selection module 2 converts this information into corresponding channel control demands, which are expressed as specific color channel demands (such as a red channel, a green channel, etc.) or brightness level demands, according to the contents of the remote control signal, as basic data for the subsequent generation of the driving signal.

S502, determining one or more driving paths according to the path selection signal. Specifically, the path selection module 2 analyses the demands of the LED lamp module 1 and determines the driving paths that need to be activated according to the previously generated path selection signals. For example, if the path selection signal indicates a need to change the color temperature or brightness of the LED lamp, the module may select the corresponding driving path according to these demands, e.g., select the RGB channel to adjust the color, or select the white channel to adjust the color temperature. The path selection signal is used to determine which driving paths need to be activated in the driving module to ensure that the LED lamp module 1 can operate correctly according to the user's demands.

S503, determining a current demand of each of the one or more driving paths according to the channel control demand, and further determining a signal duty cycle to be transmitted to each of the driving paths based on the current demand. Specifically, the path selection module 2 calculates the current required for each selected driving path according to the previously generated channel control demands. For each driving path, the magnitude of the current demand determines a duty cycle of the driving signal, i.e., the ratio of the high level time to the cycle time in the signal. For example, for channels requiring relatively high brightness, the path selection module 2 may calculate a relatively high current demand and increase the duty cycle of the driving signal accordingly to ensure that sufficient current is provided to drive the LED lamp bead. According to this current demand, the path selection module 2 may adjust the duty cycle of the driving signal to ensure that each driving path is capable of providing the appropriate current to meet the demands of the LED lamp module 1.

S504, integrating the signal duty cycle of each of the driving paths to generate the corresponding driving signal. Specifically, after calculating the duty cycle of the driving signal required for each driving path, the path selection module 2 integrates these duty cycle data to generate a complete driving signal containing control information for all driving paths at the same time. For example, if the brightness of the RGB channel and the white light channel needs to be adjusted at the same time, the path selection module 2 may generate corresponding driving signals for the RGB channel and the white light channel respectively according to the calculation results of the respective duty cycles, and combine these signals into a unified driving signal and transmit the same to the driving module 3, so as to realize the comprehensive adjustment of the LED lamp module 1. Therefore, attributes such as the brightness and color of the LED lamp comply with the user's remote control demands can be ensured by the driving signals.

According to the above-mentioned technical solution, a more accurate driving signal generation can be achieved. The channel control demand is determined by decoding a remote control signal, and a current demand of each driving path is generated based on a path selection signal, and combined with a duty cycle calculation, an optimized driving signal is finally generated, to ensure that the display effect of the LED lamp complies with a user setting. In this way, the accuracy and response speed of the driving signal can be improved, the instability of brightness or color temperature control can be avoided, and thus the LED lamp is enabled to achieve a finer brightness adjustment and color management, and the user experience and display quality can be improved.

The above-described embodiments are merely intended to illustrate the technical solutions of the present application and not to limit them. Although the present application has been described in detail with reference to the foregoing embodiments, a person skilled in the art should understand that modifications may still be made to the technical solutions described in the foregoing embodiments, or equivalent replacements may be made to some of the technical features. Such modifications or replacements shall not cause the essence of the corresponding technical solutions to depart from the spirit and scope of the technical solutions of the embodiments of the present application and shall fall within the protection scope of the present application.

DESCRIPTION OF REFERENCE NUMERALS

1. LED lamp module;
2. path selection module;
3. driving module;
31. driving chip;
32. power input subunit;
321. second unit resistor;
322. third unit resistor;
323. unit capacitor;
33. first unit resistor;
34. acquisition node;
4. AC-DC adapter module.

What is claimed is:

1. An adaptive intelligent driving circuit for light emitting diode (LED) lamps, comprising:
an LED lamp module comprising a lamp bead, a diode and a resistor, wherein an anode of the diode is connected to a power supply, a cathode of the diode is connected to a power input terminal of the lamp bead, the resistor is connected between the power input terminal of the lamp bead and the power supply, and a first capacitor and a second capacitor are connected between the cathode of the diode and ground;
a control system comprising:
a driving module comprising a plurality of driving units each comprising a driving chip and a power input subunit, a first power input terminal of the driving chip is connected to a power output terminal of the LED lamp module via one or more first unit resistors, an end portion of each of the one or more first unit resistors close to the power output terminal of the LED lamp module is provided with an acquisition node, a grounding terminal of the driving chip is grounded, a power input terminal of the power input subunit is connected to the cathode of the diode, and a power output terminal of the power input subunit is connected to a second power input terminal of the driving chip; and
a path selection module having an acquired signal input terminal connected to the acquisition node; and
an alternating-current-to-direct-current (AC-DC) adapter module having a power input terminal connected to a power grid and a power output terminal connected to a power input module of the control system,
wherein a power output terminal of the control system is connected to a power input terminal of the LED lamp module, a remote signal receiving terminal of the control system is configured for receiving remote control signals comprising an APP-side control signal and a remote controller control signal, the control system is configured for generating driving signals having interleaved phases and transmitted through corresponding driving paths according to the remote control signals, and the driving signals correspond to different channels of the LED lamp module, so that various lamp beads in the different channels of the LED lamp module switch to operate at different time points.

2. The adaptive intelligent driving circuit for the LED lamps according to claim 1, wherein the power input subunit comprises:
a second unit resistor;
a third unit resistor; and
a unit capacitor,
wherein a first end of the second unit resistor is connected to the cathode of the diode, a second end of the second unit resistor is connected to a first end of the third unit resistor, a second end of the third unit resistor is grounded, and the unit capacitor is connected between the second end of the second unit resistor and the ground.

3. The adaptive intelligent driving circuit for the LED lamps according to claim 1, wherein the driving module is a multi-channel driving module, and the LED lamp module comprises one or more lamp display units;
the driving module and each of the one or more lamp display units constitute a power supply loop;

the acquired signal input terminal of the path selection module is connected to a signal output terminal of the LED lamp module to acquire lamp bead type data of the LED lamp module;

a data communication terminal of the path selection module communicates with a cloud platform to acquire adaptive voltage data of the LED lamp module, and the path selection module is configured to generate corresponding driving signals according to the adaptive voltage data, the lamp bead type data and the remote control signals; and a driving signal input terminal of the driving module is connected to a driving signal output terminal of the path selection module, so that the driving module receives the corresponding driving signals to control lamp display units of the one or more lamp display units located in a same power supply loop as the driving module to perform corresponding lamp display operations.

4. An adaptive intelligent driving method for LED lamps applied to the adaptive intelligent driving circuit for the LED lamps according to claim 1, wherein the driving module is a multi-channel driving module, and the adaptive intelligent driving method for the LED lamps comprises:

controlling the path selection module to detect in real time whether an infrared coverage signal appears at the acquisition node between an LED lamp module template and the driving module;

determining that the LED lamp module presents in the LED lamp module template when the infrared coverage signal is detected, and parsing the infrared coverage signal to generate corresponding lamp bead type data;

controlling the path selection module to acquire adaptive voltage data of the LED lamp module based on data communication with a cloud platform;

inputting the lamp bead type data and the adaptive voltage data into an established driving path selection algorithm model to generate corresponding driving path selection signals; and when the remote control signal is received, generating a corresponding driving signal of the driving signals based on the remote control signal and the corresponding driving path selection signals, and controlling the path selection module to transmit the corresponding driving signal to the driving module so that the LED lamp module performs corresponding lamp display operations.

5. The adaptive intelligent driving method for the LED lamps according to claim 4, wherein an upper side and a lower side of the acquisition node are respectively provided with a transmitter component and a receiver component of an infrared sensing element, and the infrared coverage signal is a signal generated when a channel port of the LED lamp module connected to the driving module is irradiated by infrared rays from the transmitter component and the receiver component, and the method further comprises:

when the receiver component fails to receive the infrared rays, starting timing to generate corresponding timing data, and comparing the timing data with a preset coverage threshold in real time;

when the timing data exceeds the preset coverage threshold, reading a matching code of the receiver component, and matching corresponding channel type data according to the matching code; and integrating the matching code and one or more pieces of the corresponding channel type data to generate a corresponding infrared coverage signal.

6. The adaptive intelligent driving method for the LED lamps according to claim 5, wherein the parsing the infrared coverage signal to generate the corresponding lamp bead type data comprises:

standardizing the infrared coverage signal to generate corresponding standardized data, wherein the corresponding standardized data at least comprises code data corresponding to the matching code and first type data corresponding to each piece of the one or more pieces of the corresponding channel type data;

determining whether a corresponding type template is matched in an established type database based on the code data;

when the corresponding type template is matched, verifying whether second type data in the corresponding type template is consistent with the first type data, when inconsistent, transmitting a signal acquisition request to acquire a new infrared coverage signal for parsing, and when consistent, determining the first type data as the lamp bead type data; and when no corresponding type template is matched, establishing a new type template and assigning the first type data as second type data to the new type template, and after the new type template is stored in the established type database, determining the second type data in the new type template as the lamp bead type data.

7. The adaptive intelligent driving method for the LED lamps according to claim 4, wherein the inputting the lamp bead type data and the adaptive voltage data into the established driving path selection algorithm model to generate the corresponding driving path selection signals comprises:

determining a minimum driving demand according to the lamp bead type data, and generating a corresponding base weight based on the minimum driving demand;

determining a cost-control driving demand according to the adaptive voltage data, and generating a corresponding balance weight based on the cost-control driving demand;

determining a corresponding type coefficient and a voltage adaptation coefficient based on the established driving path selection algorithm model, and adding a product of the corresponding type coefficient and the base weight and a product of the voltage adaptation coefficient and the corresponding balance weight to generate corresponding path selection parameters; and generating the corresponding driving path selection signals based on a predetermined mapping relationship of the corresponding path selection parameters.

8. The adaptive intelligent driving method for the LED lamps according to claim 7, wherein the generating the corresponding driving signal based on the remote control signal and the corresponding driving path selection signals comprises:

decoding the remote control signal to generate a corresponding channel control demand;

determining one or more driving paths according to the corresponding driving path selection signals;

determining a current demand of each of the one or more driving paths according to the corresponding channel control demand, and further determining a signal duty cycle to be transmitted to each of the one or more driving paths based on the current demand; and integrating the signal duty cycle of each of the one or more driving paths to generate the corresponding driving signal.

9. An adaptive intelligent driving method for light emitting diode (LED) lamps applied to an adaptive intelligent driving circuit for the LED lamps,
wherein the adaptive intelligent driving circuit for the LED lamps comprises:
an LED lamp module;
a control system comprising a path selection module and a driving module, wherein the driving module is a multi-channel driving module; and
an alternating-current-to-direct-current (AC-DC) adapter module having a power input terminal connected to a power grid and a power output terminal connected to a power input module of the control system, wherein a power output terminal of the control system is connected to a power input terminal of the LED lamp module, a remote signal receiving terminal of the control system is configured for receiving remote control signals comprising an APP-side control signal and a remote controller control signal, the control system is configured for generating driving signals having interleaved phases and transmitted through corresponding driving paths according to the remote control signals, and the driving signals correspond to different channels of the LED lamp module, so that various lamp beads in the different channels of the LED lamp module switch to operate at different time points, and
the adaptive intelligent driving method for the LED lamps comprises:
controlling the path selection module to detect in real time whether an infrared coverage signal appears at an acquisition node between an LED lamp module template and the driving module;
determining that the LED lamp module presents in the LED lamp module template when the infrared coverage signal is detected, and parsing the infrared coverage signal to generate corresponding lamp bead type data;
controlling the path selection module to acquire adaptive voltage data of the LED lamp module based on data communication with a cloud platform;
inputting the lamp bead type data and the adaptive voltage data into an established driving path selection algorithm model to generate corresponding driving path selection signals; and
when the remote control signal is received, generating a corresponding driving signal of the driving signals based on the remote control signal and the corresponding driving path selection signals, and controlling the path selection module to transmit the corresponding driving signal to the driving module so that the LED lamp module performs corresponding lamp display operations.

10. The adaptive intelligent driving method for the LED lamps according to claim 9, wherein an upper side and a lower side of the acquisition node are respectively provided with a transmitter component and a receiver component of an infrared sensing element, and the infrared coverage signal is a signal generated when a channel port of the LED lamp module connected to the driving module is irradiated by infrared rays from the transmitter component and the receiver component, and the method further comprises:
when the receiver component fails to receive the infrared rays, starting timing to generate corresponding timing data, and comparing the timing data with a preset coverage threshold in real time;
when the timing data exceeds the preset coverage threshold, reading a matching code of the receiver component, and matching corresponding channel type data according to the matching code; and
integrating the matching code and one or more pieces of the corresponding channel type data to generate a corresponding infrared coverage signal.

11. The adaptive intelligent driving method for the LED lamps according to claim 10, wherein the parsing the infrared coverage signal to generate the corresponding lamp bead type data comprises:
standardizing the infrared coverage signal to generate corresponding standardized data, wherein the corresponding standardized data at least comprises code data corresponding to the matching code and first type data corresponding to each piece of the one or more pieces of the corresponding channel type data;
determining whether a corresponding type template is matched in an established type database based on the code data;
when the corresponding type template is matched, verifying whether second type data in the corresponding type template is consistent with the first type data, when inconsistent, transmitting a signal acquisition request to acquire a new infrared coverage signal for parsing, and when consistent, determining the first type data as the lamp bead type data; and
when no corresponding type template is matched, establishing a new type template and assigning the first type data as second type data to the new type template, and after the new type template is stored in the established type database, determining the second type data in the new type template as the lamp bead type data.

* * * * *